US011695867B1

(12) United States Patent
Palandurkar et al.

(10) Patent No.: US 11,695,867 B1
(45) Date of Patent: Jul. 4, 2023

(54) METHODS AND SYSTEMS FOR FACILITATING CONTEXT-TO-CALL COMMUNICATIONS BETWEEN COMMUNICATION POINTS VIA DEDICATED CONTEXT-TO-CALL-ENABLED CONTACT NUMBERS

(71) Applicant: V GROUP INC., Cranbury, NJ (US)

(72) Inventors: Vijay Kumar Palandurkar, West Windsor Township, NJ (US); Aakash Savita, Dayton, NJ (US)

(73) Assignee: V GROUP INC., Cranbury, NJ (US)

( * ) Notice: Subject to any disclaimer, the term of this patent is extended or adjusted under 35 U.S.C. 154(b) by 0 days.

(21) Appl. No.: 18/063,008

(22) Filed: Dec. 7, 2022

(51) Int. Cl.
*H04M 3/42* (2006.01)

(52) U.S. Cl.
CPC ... *H04M 3/42306* (2013.01); *H04M 3/42068* (2013.01)

(58) Field of Classification Search
CPC ............. H04M 3/42306; H04M 3/42068
USPC ............ 379/201.01, 201.04, 201.02, 265.05, 379/265.09, 265.01, 201.07, 201.08, 379/201.05, 207.02
See application file for complete search history.

(56) References Cited

U.S. PATENT DOCUMENTS

2004/0255034 A1* 12/2004 Choi ............... H04L 9/40
709/229

FOREIGN PATENT DOCUMENTS

| AU | 2017203847 B2 | 11/2018 |
|----|---------------|---------|
| KR | 102447546 B1 | 9/2022 |

OTHER PUBLICATIONS

Jane Coughlan and Robert D. Macredie, Effective Communication in Requirements Elicitation: A Comparison of Methodologies, Requirements Eng (2002) 7:47-60, Feb. 19, 2014, United Kingdom.

* cited by examiner

*Primary Examiner* — Thjuan K Addy
(74) *Attorney, Agent, or Firm* — Kanika Radhakrishnan; Evergreen Valley Law Group

(57) ABSTRACT

Methods and systems for facilitating communication sessions between multiple communication points via a contact number. The method includes receiving a purchase request from a first user device, through a first communication point which is enabled with a context-to-call (C2C) feature. The method further includes facilitating displaying of a predetermined list of contact numbers on the first user device and receiving a contact number selected by the first user. The method also includes processing the purchase request based, at least in part, on receiving subscription fees. The method also includes assigning the contact number to a C2C-enabled account of the first user, as a dedicated C2C-enabled contact number, based, at least in part, on purchase request-processing step. The method also includes facilitating the C2C-enabled account of the first user to receive calls from second user(s), on the dedicated C2C-enabled contact number, based, at least in part, on C2C contact-assigning step.

22 Claims, 13 Drawing Sheets

METHODS AND SYSTEMS FOR FACILITATING CONTEXT-TO-CALL COMMUNICATIONS BETWEEN COMMUNICATION POINTS VIA DEDICATED CONTEXT-TO-CALL-ENABLED CONTACT NUMBERS

TECHNICAL FIELD

The present invention relates to the field of communications and, more particularly, for facilitating context-to-call communications between multiple communication points via a dedicated context-to-call-enabled contact number.

BACKGROUND

Companies use a single location known as a contact center to manage client interactions across all channels. Their primary objective is to offer customers effective and efficient sales, customer, and technical assistance. Contact center systems that help users with a service or product offer the capability to submit service requests, which may include questions regarding a product or service. Most of the time, contact center systems accept customer support requests made via phone call, email, instant messaging, or web and then forward them to a human agent who will process them and provide the necessary information.

Conventionally, when a user wants to directly contact a business or a customer representative or agent via the number/or email address provided on the website, the user would have to copy the number from the website to a mobile phone to place the call or have to send an email with a few clicks. Additionally, the user may also contact a chatbot; however, the majority of chatbots are trained to answer a particular set of fed intents that have less probability of providing an accurate response to the user. Few chatbot platforms provide phone numbers towards the end of an unresolved interaction forcing users to dial a number and traverse complicated menus till they reach an agent who can assist them with the problem.

This wastes users' time and effort because they have to re-state their call's purpose and authenticate before receiving any assistance. It also increases user uncertainty about whether the message has reached the intended recipient, which frequently irritates users and eliminates opportunities for potential business growth.

Furthermore, contact centers are becoming more crucial as customers demand businesses to be continually accessible across several channels, not just over the phone. Utilizing an omnichannel strategy, contact centers may improve customer service, boost productivity, and gain deeper insights into the demands and behaviors of their clients. Hence, the contact centers can also include voice over IP (VoIP), website support, real-time communication for the web, etc., apart from phone calls, emails, messages, etc.

However, the contact centers are expected to continue to adapt and grow, as technology evolves, and hence, utilizing the omnichannel strategy may not be enough to fulfill the customer demands, meet financial restrictions, and provide fully-fledged customer service. Moreover, the complexity of using the technology or systems associated with such contact centers can demotivate the customers from using such systems.

Hence, there is a need for methods and systems including a single platform that enables interaction between multiple communication points via a dedicated context-to-call-enabled contact number.

SUMMARY

Various embodiments of the present disclosure provide methods and systems for facilitating communication between multiple communication points via a dedicated context-to-call-enabled contact number.

In an embodiment, a computer-implemented method is disclosed. The computer-implemented method includes receiving a purchase request from a first user device associated with a first user, through a first communication point. The computer-implemented method further includes facilitating displaying of a predetermined list of contact numbers on the first user device, through the first communication point. The computer-implemented method includes receiving a contact number selected by the first user through the first communication point, from the predetermined list of contact numbers displayed on the first user device. The computer-implemented method further includes processing the purchase request based, at least in part, on receiving subscription fees from the first user device for facilitating purchasing of the contact number selected by the first user. Furthermore, the computer-implemented method includes assigning the contact number selected by the first user to a context-to-call (C2C)-enabled account of the first user, as a dedicated C2C-enabled contact number, based, at least in part, on the purchase request-processing step. The computer-implemented method also includes facilitating the C2C-enabled account of the first user to receive calls from one or more second users, on the dedicated C2C-enabled contact number, based, at least in part, on the contact-assigning step.

In another embodiment, a server system is disclosed. The server system includes a memory configured to store instructions, a communication interface, and a processor configured to execute the instructions stored in the memory and thereby cause the server system to receive a purchase request from a first user device associated with a first user, through a first communication point. The server system is configured to facilitate displaying of a predetermined list of contact numbers on the first user device, through the first communication point. The server system is further configured to receive a contact number selected by the first user through the first communication point, from the predetermined list of contact numbers displayed on the first user device. The server system is further caused to process the purchase request based, at least in part, on receiving subscription fees from the first user device for facilitating a purchasing of the contact number selected by the first user. The server system is caused to assign the contact number selected by the first user to a context-to-call (C2C)-enabled account of the first user, as a dedicated C2C-enabled contact number, based, at least in part, on the purchase request-processing step. Further, the server system is configured to facilitate the C2C-enabled account of the first user to receive calls from one or more second users, on the dedicated C2C-enabled contact number, based, at least in part, on the C2C contact-assigning step.

BRIEF DESCRIPTION OF THE FIGURES

For a more complete understanding of example embodiments of the present technology, reference is now made to the following descriptions taken in connection with the accompanying drawings in which.

Figure 1:
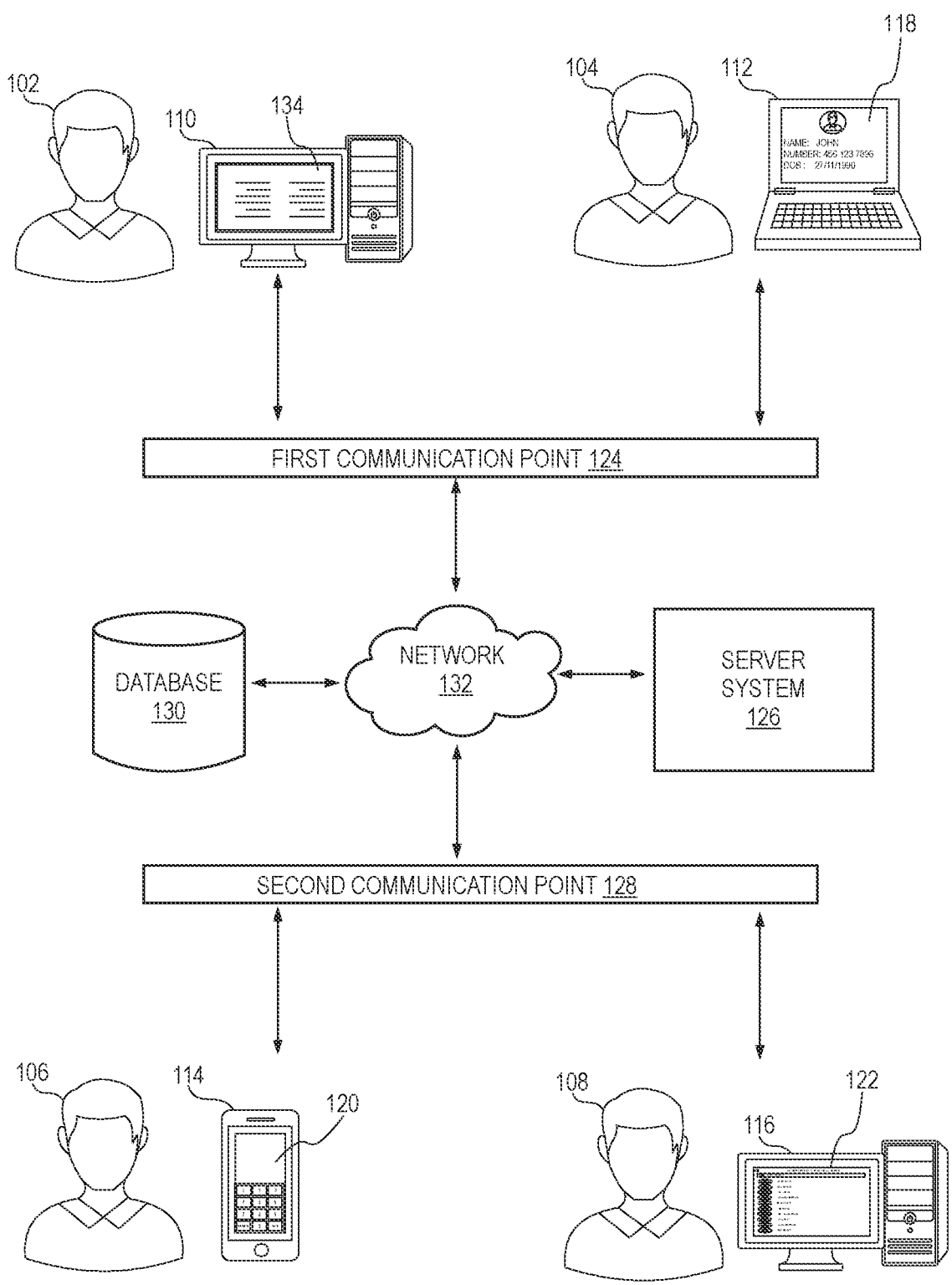
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for facilitating communication sessions between multiple communication points via a dedicated context-to-call-enabled contact number.

A context-to-call (C2C) application may be provided to user devices as a plugin. The C2C application may be provided, by a server system configured to facilitate communication sessions between two or more communication points associated with the user devices via a dedicated C2C-enabled contact number. This enables users to have a fully functional software-based calling experience over an internet connection without designated hardware such as a cellular phone, a telephone, and/or the like. Further, for facilitating such communication sessions via a dedicated contact number, the server system may facilitate the user devices to purchase the dedicated contact number, thereby enabling the user devices associated with the dedicated contact number to receive calls from other user devices associated with other users.

In an embodiment, all the user devices included for a communication session may be enabled with a C2C feature. The C2C feature may also be developed by a third-party platform or downloaded from a third-party server in some embodiments. The C2C application or the C2C feature enables a plurality of features such as making an outgoing call (voice/video), receiving an incoming call (voice/video), conference calling, call forwarding, call recording, click to call feature, sending an email, sending and receiving short message service (SMS), sending and receiving messages through chats (text/multimedia), add/edit/delete/one or more contact numbers, ability to mark the one or more contact numbers as a favorite contact, and/or the like.

In a further embodiment, the server system is configured to facilitate the users to initiate a purchase request. The purchase request may be associated with a facility to purchase a dedicated contact number and assign the same to a C2C-enabled account of each of the users. In an embodiment, the users may be facilitated to download the C2C application provided by the server system onto the user devices. The C2C application may include a plurality of options that facilitates the users to purchase a dedicated contact number and assign the same to the C2C-enabled contact number, for facilitating the users to initiate a communication session using the user devices. Each of the user devices is associated with a dedicated contact number for receiving calls from other user devices associated with other users.

In an embodiment, the server system is configured to facilitate the users to download a suitable version of the C2C application based on the type of user devices. For example, the server system may facilitate a C2C desktop application if the user devices are desktops or laptops. In another example, the user devices may be a smartphone or a smart speaker. The C2C application may be provided as a mobile application or as a smart speaker application respectively.

In an example, the server system is further configured to receive the purchase request from a first user device associated with a first user, through a first communication point. The purchase request may be initiated by using the C2C application on the first user device. The first communication point may be one of, but not limited to, a C2C chatbot plugin, a C2C mobile application, a C2C smart TV application, a C2C browser plugin, a C2C business mobile application, a C2C desktop application, and/or the like. In an example of a customer service application, where agents of a customer service provider purchase a contact number using the C2C application so that the agents can receive calls from customers, the first user may be the agents. Thus, in such an example, the first communication point may be one of, but not limited to, an agent phone, a C2C agent mobile application, a third party agent mobile application, a C2C agent desktop application, a third party agent desktop application, an agent email, an agent smart speaker, a C2C agent website application, a third party agent website application, and the like.

Upon initiating the purchase request, the first user may be willing to receive a response. In an embodiment, the response may include displaying contact numbers on a user interface (UI) presented on the first user device, from which the first user can select one contact number. Thus, in an embodiment, the server system may be configured to facilitate displaying of a predetermined list of contact numbers on the first user device, through the first communication point. The server system may be caused to generate the predetermined list of contact numbers, through a third-party communication facilitating platform. For example, the third-party communication facilitating platform may be a third-party application, a third-party plugin, and/or the like. In an embodiment, the third-party communication facilitating platform may provide a list of pre-generated contact numbers, that are generated using pre-defined methods and techniques by applying pre-defined rules, for the server system and other platforms, so that they can use them for facilitating a context to call communication facility for the users. Upon generation, the list of pre-generated contact numbers (i.e. predetermined list of contact numbers) is displayed on the UI presented on the first user device.

Further, in an embodiment, the first user may select one contact number from the predetermined list of contact numbers displayed on the UI presented on the first user device. The server system is hence configured to receive a contact number selected by the first user through the first communication point, from the predetermined list of contact numbers displayed on the first user device.

Upon receiving the contact number selected by the first user, the server system may facilitate the first user device to initiate a payment of subscription fees corresponding to a facility to purchase the contact number selected by the first user. Furthermore, the server system is configured to process the purchase request based, at least in part, on receiving the subscription fees from the first user device for facilitating a purchasing of the contact number selected by the first user.

In an embodiment, an amount associated with the subscription fees is dependent on a subscription plan selected by the first user, from a list of subscription plans displayed on the first user device. A UI is facilitated by the C2C application to display the list of subscription plans on the first user device. The UI is facilitated to be presented on the first user device. For example, a subscription plan could be a basic subscription plan valid for a first predefined tenure associated with a first predetermined amount, a premium subscription plan valid for a second predefined tenure associated with a second predetermined amount, an unlimited subscription plan valid for a third predefined tenure associated with a third predetermined amount, and/or the like. Here, the first predetermined amount may be less than the second predetermined amount, the second predetermined amount may be less than the third predetermined amount, and so on. Similarly, the first predefined tenure may be less than the second predefined tenure, the second predefined tenure may be less than the third predefined tenure, and so on. Moreover, as an example, tenure may be of one month, three months, six months, one year, and/or the like.

In the case of C2C application, when the first user purchases the basic subscription plan, the first user can use the contact number purchased, for the first predefined tenure, and then renew the subscription plan, if the first user is willing to use the same contact number in the future. Further, the server system facilitates the first user device to initiate the payment of the subscription fees in multiple payment modes. Examples of the multiple payment modes include payment in cash, using debit cards, using credit cards, electronic bank transfers, scanning Quick Response (QR) codes, email invoicing, and/or the like. The first user may perform payment operations using one of the multiple payment modes.

Furthermore, the server system is caused to assign the contact number selected by the first user to a C2C-enabled account of the first user, as a dedicated C2C-enabled contact number, based, at least in part, on the purchase request-processing step. The server system is further configured to facilitate the C2C-enabled account of the first user to receive calls from one or more second users, on the dedicated C2C-enabled contact number, based, at least in part, on the C2C contact-assigning step. Once the C2C-enabled account of the first user is facilitated to receive the calls from the one or more second users, then a communication session can successfully be established between one or more first users and the one or more second users via respective one or more first user devices and respective one or more second user devices, respectively.

In an embodiment, assigning the contact number to the C2C-enabled account of the first user may refer to linking the contact number to the C2C-enabled account, programmatically, logically, digitally, operationally, or the like. Now that the C2C-enabled account of the first user is linked with the contact number purchased by the first user as the dedicated C2C-enabled contact number, the first user can receive calls on the C2C application via the dedicated C2C-enabled contact number.

Moreover, for establishing the communication session, the server system facilitates a second user device associated with a second user to initiate a communication request. Thus, in an embodiment, the server system is configured to receive the communication request from the second user device associated with the second user, through a second communication point, for initiating the communication session with the first user. The communication request may be initiated by using the C2C application on the second user device. The communication request may be initiated in multiple ways. In one embodiment, the multiple ways may include dialing the contact number on a dial pad displayed on a UI. The UI is facilitated by the C2C application and presented on the second user device, for the second user to access the dial pad. In an alternative embodiment, the multiple ways may include selecting one contact number from a list of contact numbers displayed on the UI, and clicking on a dial button to dial the contact number selected by the second user for connecting the call. Therefore, the communication request may be initiated based, at least in part, on one of dialing the dedicated C2C-enabled contact number through the dialing pad on the second communication point and selecting the dedicated C2C-enabled contact number from a contact list personalized to the second user through the second communication point.

The second communication point may be one of, but not limited to, a C2C chatbot plugin, a C2C mobile application, a C2C smart TV application, a C2C browser plugin, C2C business mobile application, and C2C desktop application. The user may select a communication mode during the initiation process such as a video call, voice call, voice note, instant message (IM), SMS, email, etc.

In one embodiment, the server system is configured to determine a second user-communication mode selected on the second user device through the second communication point. The second user-communication mode may be one of a video call, an audio call, an email, or the like. Further, the server system is configured to identify a first user-communication mode selected on the first user device. The first user-communication mode may be one of a video call, an audio call, an email, or the like.

Furthermore, the server system is configured to process the communication request based, at least in part, on a matching between the first user-communication mode and the second user-communication mode. The server system may initiate the communication session without any mode conversion if both the communication modes are the same. In cases where the communication modes are different, the server system may perform mode conversions and facilitate communication sessions between the first communication point and the second communication point.

In one embodiment, the server system is configured to transmit the communication request from the second user device through the second communication point to the first user device through the first communication point. The server system is further configured to initiate a communication session between the first user device and the second user device through the first communication point and the second communication point.

In one embodiment, the server system is configured to facilitate adding one or more user devices to a communication session that is already initiated between two users, by calling respective dedicated C2C-enabled contact numbers. One or more user devices may be added by any of the two users via the first communication point or the second communication point for creating a conference call. Further, multiple users present in the conference call may be allowed to communicate with each other via the communication points. Additionally, the communication modes selected by each of the multiple user devices in the conference call may be different.

In an example embodiment, the server system may receive a message from a user device through the second communication point. The communication modes selected by the user devices for communication may be an audio call and a text message respectively. Since the communication modes are different, the server system is configured to convert the format of the message in accordance with the communication modes selected by the user devices for communication. Further, the server system is configured to send the converted message to the first communication point which may be viewed on the user device, through the first communication point.

Various embodiments of the present disclosure offer multiple advantages and technical effects. For instance, the present disclosure provides a single platform that is able to make communication sessions possible between multiple communication points being used in multiple communication modes via a contact number. In some embodiments, the present disclosure provides various context-to-call features such as making an outgoing call (voice/video), receiving an incoming call (voice/video), conference calling, call forwarding, call recording, click-to-call feature, sending an email, sending and receiving short message service (SMS), sending and receiving messages through chats (text/multimedia), add/edit/delete/one or more contact numbers, ability to mark the one or more contact numbers as a favorite contact, and/or the like. Such features enhance the user experience while using the C2C application, as a dedicated contact number now can be used for making calls via the C2C application which resembles a conventional calling mechanism. These features may be used by business entities and/or call centers for serving their customers better and fast, and for customers to get their concerns resolved better and fast. In an embodiment, the present disclosure provides options for the user to select the data that is accessible by the server system or any third party servers. This enables data security for the users and provides privacy to sensitive data.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, facilitating a communication session between at least two communication points operating in different communication modes via respective dedicated contact numbers. Examples for multiple communication points may include, but not limited to, chatbot plugins, mobile applications, smart TV applications, browser plugins, web applications, smart speaker applications, etc. Examples of different communication modes may include, but not limited to, video call, audio call, text message, instant messages (IMs), voice notes, etc. Further, in an embodiment, the respective dedicated contact numbers may include contact numbers generated using the pre-defined methods and techniques by following the pre-defined rules.

The environment 100 generally includes a plurality of users 102, 104, 106 and 108 associated with a plurality of user devices 110, 112, 114, and 116 respectively. Each of the plurality of use devices 110, 112, 114, and 116 is associated with a respective dedicated contact number 118, a dial pad 120 and/or a contact list option 122. The environment 100 further depicts a first communication point 124, a server system 126, a second communication point 128 and a database 130 each connected to, and in communication with (and/or with access to) a network 132.

In a specific scenario, suppose the user device 110 may be desktop and associated with the user 102, wherein the user device 110 is displaying a predetermined list of contact numbers 134 as shown in FIG. 1. The user 102, may have to select one contact number from the predetermined list of contact numbers 134, and purchase the same so that the corresponding contact number (i.e., the dedicated contact number 118) can be used by the user 102 for receiving calls from other users such as 106 and 108.

In another specific scenario, suppose the user 104 has already purchased the dedicated contact number 118. Now, the user device 112 may be a laptop, and associated with the user 104, may be displaying the corresponding dedicated contact number 118 as shown in FIG. 1. The user 104, may then use the dedicated contact number 118 for receiving calls from other users such as 106 and 108.

Further, in yet another scenario, consider the user device 114 to be a mobile phone, and associated with the user 106, wherein the user device 114 may be displaying the dial pad 120 as shown in FIG. 1. The user 106, may then dial the dedicated contact number 118 via the dial pad 120, for contacting the user devices such as 110 and 112 associated with the users such as 102 and 104 respectively.

Furthermore, in yet another scenario, consider the user device 116 to be a desktop and associated with the user 108, wherein the user device 116 may be displaying the contact list option 122 as shown in FIG. 1. The user 108, may then select one contact number (i.e., the dedicated contact number 118) from the contact list option 122 displayed on the user device 116, and place the call, thereby contacting the user devices such as 110 and 112 associated with the users such as 102 and 104 respectively.

Moreover, only two communication points 124 and 128 are shown for representation purposes only, and there may be many such communication points. The network 132 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 132 in accordance with various wired and wireless communication protocols, such as, Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. The network 132 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 132 may include multiple different networks, such as a private network made accessible by the first communication point 124, the server system 126, the second communication point 128, and the database 130 separately, and/or a public network (e.g., the Internet) through which the first communication point 124, the server system 126, the second communication point 128, and the database 130 may communicate.

It should be noted that the number of the users, the user devices and the communication points described herein are only used for exemplary purposes and do not limit the scope of the invention. The main objective of the invention is to provide a single platform that will be able to make communication sessions possible between multiple communication points being used in multiple communication modes, via a dedicated contact number 118.

The user devices 110-116 may be one of, but not limited to, a mobile phone, a smart speaker, a desktop, a smart television, a laptop, and the like. The plurality of user devices 110-116 is configured to download or use a context-to-call (C2C) platform facilitated by the server system 126. The C2C feature may be enabled on any digital device, wherein the C2C feature may be incorporated according to the configuration supported by the user devices 110-116. The C2C connection may be hosted within the premises of an organization or a private/public cloud.

In an example, the users 102 and 104 may be an agent and/or a representative at a business entity or a call center, appointed to provide service to customers, and the users 106 and 108 may be the customers. Further, user devices 110 and 112 may be devices installed at the business entity or a call center.

Customers, potential customers, or other end users such as the users 106 and 108 desiring to receive services from a contact center or business may initiate communication through multiple communication modes to the contact center via their user devices such as the user devices 114 and 116. Each of the user devices 110-116 may be a communication device conventional in the art, such as, for example, a telephone, wireless phone, smartphone, personal computer, electronic tablet, and/or the like. Users operating the user devices 110-116 may initiate, manage, and respond to telephone calls, emails, chats, text messaging, web-browsing sessions, and other multi-media transactions.

In an embodiment, the server system 126 is configured to facilitate communication sessions between the first communication point 124 and the second communication point 128. The server system 126 is configured to provide a context-to-call (C2C) application that acts as a single communication channel for connecting the user devices 110 and 112 to the user devices 114 and 116, each being associated with the dedicated contact number 118. The server system 126 is configured to facilitate one of the users 102 and 104 to initiate a purchase request through the first communication point 124. The server system 126 is configured to generate the predetermined list of contact numbers 134 using a third-party communication facilitating platform. The server system 126 is further configured to facilitate one of the user devices 110 and 112 to display the predetermined list of contact numbers 134 on a UI associated with the user devices 110 and 112. The server system 126 is then caused to facilitate the users 102 and 104 to select one contact number from the predetermined list of contact numbers 134 presented on the UI.

In one embodiment, the server system 126 is further caused to facilitate the user devices 110 and 112 to initiate a payment of subscription fees corresponding to a facility to purchase the contact number selected by the users 102 and 104. Furthermore, the server system 126 is configured to assign the contact number purchased by the users 102 and 104 to a C2C-enabled account of the users 102 and 104, as the dedicated contact number 118 or a dedicated C2C-enabled contact number 118. Upon assigning the contact number as the dedicated C2C-enabled contact number 118, the server system 126 then facilitates the C2C-enabled account of the users 102 and 104 to receive calls from the users 106 and 108 on the dedicated contact number 118.

Further, for the users 106 and 108 to make a call to the users 102 and 104, or to establish a communication session with the users 102 and 104, the server system 126 facilitates the user devices 114 and 116 to initiate a communication request through the second communication point 128. In one embodiment, the server system 126 facilitates the user devices 114 and 116 to initiate the communication request by facilitating the users 106 and 108 to dial the dedicated contact number 118 via the dial pad 120 displayed on a UI associated with the user devices 114 and 116. In another embodiment, the server system 126 facilitates the users 106 and 108 to select the dedicated contact number 118 from a list of contact numbers (i.e., the contact list option 122) displayed on the UI associated with the user devices 114 and 116, and then click on a dial button on the UI to initiate the call.

The server system 126 is configured to determine a communication mode selected by the users 106 and 108 on their respective user devices 114 and 116. The selected mode of communication may be one of a video call, an audio call, a text message, an IM, or a voice note. The server system 126 is further configured to identify a communication mode selected by the one of the user devices 110 and 112 associated with the users 102 and 104 respectively.

In one embodiment, after the server system 126 initiates a communication session in a first selected mode, the server system 126 may transmit the communication request from the user devices 114 and 116 to the user devices 110 and 112 through the second communication point 128, wherein each of the user devices 110 and 112 and the second communication point 128 is enabled with the C2C feature. The server system 126 may then determine a second selected mode for communication, selected by the user device 110 and 112. The first and second communication modes may be one of a video call, an audio call, a text message, an instant message (IM), or a voice note.

After the first and second communication modes are determined by the server system 126, the server system 126 is configured to process the communication request by performing a matching of a first user-communication mode and a second user-communication mode. Here the first user-communication mode and the second user-communication mode may be same as the first communication mode and the second communication mode, respectively. Matching of the first user and second user communication mode refers to checking if the first user and second user communication modes are the same or different. Depending on the matching step, the server system 126 is configured to transmit the communication request and initiate the communication session.

The server system 126 is configured to transmit the communication request initiated by one of the user devices 114 and 116 through the second communication point 128 to one of the user devices 110 and 112 through the first communication point 124. After the transmission, the server system 126 may initiate a communication session between the user devices through the first communication point 124 and the second communication point 128.

In one embodiment, the server system 126 is configured to convert the format of messages conveyed between the user devices in accordance with the communication modes selected on the user devices for communication.

In one example embodiment, the first communication point 124 may be for example, but not limited to, an agent phone, an agent mobile application, an agent desktop application, an agent email, an agent smart speaker, an agent website application, and the like. According to an embodiment, the components of the environment 100 using which services are provided, may be offered as cloud services using a subscription based software as service (SaaS) application. Similarly, the second communication point 128 may be for example, but not limited to, a chatbot plug-in, a mobile application, a smart appliance, a browser plug-in, a browser mobile application plug-in, a desktop application and the like.

In an example embodiment, context-to-call client component may be configured to be incorporated to the second communication point 128 to connect and communicate with the first communication point 124, while the first communication point 124 is incorporated at the business entity or contact center. The server system 126 generates a unique identifier (ID) when a business user or a contact center signs up for context-to-call service. The generated unique ID is used for authenticating the context-to-call service requests from the first communication point 124 over the network 132. The network 132 may facilitate communications and exchange of data between the end-users, the context-to-call application, the communication points and the contact center or business entity. Each network may be any type of network familiar to those skilled in the art that can support data communications using any of a variety of commercially-available communication channels.

The example database 130 is shown to be in operative communication with the server system 126 for illustration purposes. The database 130 may store CRM information, data related to user interactions with user devices 110 and 112 in the contact center, and the like. In addition to the engagement data, the database 130 may store data associated with the customer care centers, a list of contact numbers generated, and subscription-related rules.

In an additional embodiment, the server system 126 may allow multiple users to communicate with each other using multiple communication points via the dedicated contact number 118. In an example, the server system 126 may initiate a communication session between the user device 110 through the first communication point 124 and the user device 116 through the second communication point 128. The user 108 present at the user device 116 may further connect to another user 106 with the user device 114 via the second communication point 128 creating a conference call.

In another example, the server system 126 may initiate a communication session between the user device 110 through the first communication point 124 and the user device 114 through the second communication point 128. Further, the user 102 may add another user 108 associated with the user device 116 using the user device 110 through the first communication point 124 to communicate with the user device 110 through second communication point 128 creating a conference call.

Similarly, one or more user devices may be added to a communication session by the one or more users of the plurality of users 102-108 via at least one of the first communication point 124 and the second communication point 128 connecting via respective dedicated contact numbers, for creating conference calls. The addition of multiple user devices onto a communication session facilitates the multiple users to communicate with each other using multiple user devices via multiple communication points.

Alternatively, in an embodiment, the server system 126 is configured to receive a non-C2C contact-based communication request from the user devices such as 110 and 112, through the first communication point 124. In such an embodiment, the users such as 102 and 104 may not be required to purchase the dedicated contact number 118, and get a personal contact number linked to the C2C-enabled account of the users 102 and 104. The server system 126 is caused to process the non-C2C contact-based communication request, based, at least in part, on examination of a non-C2C contact number being associated with the user devices 110 and 112 and the users 102 and 104 being logged-in to the C2C-enabled account. The server system 126 is further configured to facilitate the C2C-enabled account of the users 102 and 104 to receive calls from the users devices 114 and 116 associated with the users 106 and 108, on the non-C2C contact number, based, at least in part, on the non-C2C contact-processing step.

Figure 2A:
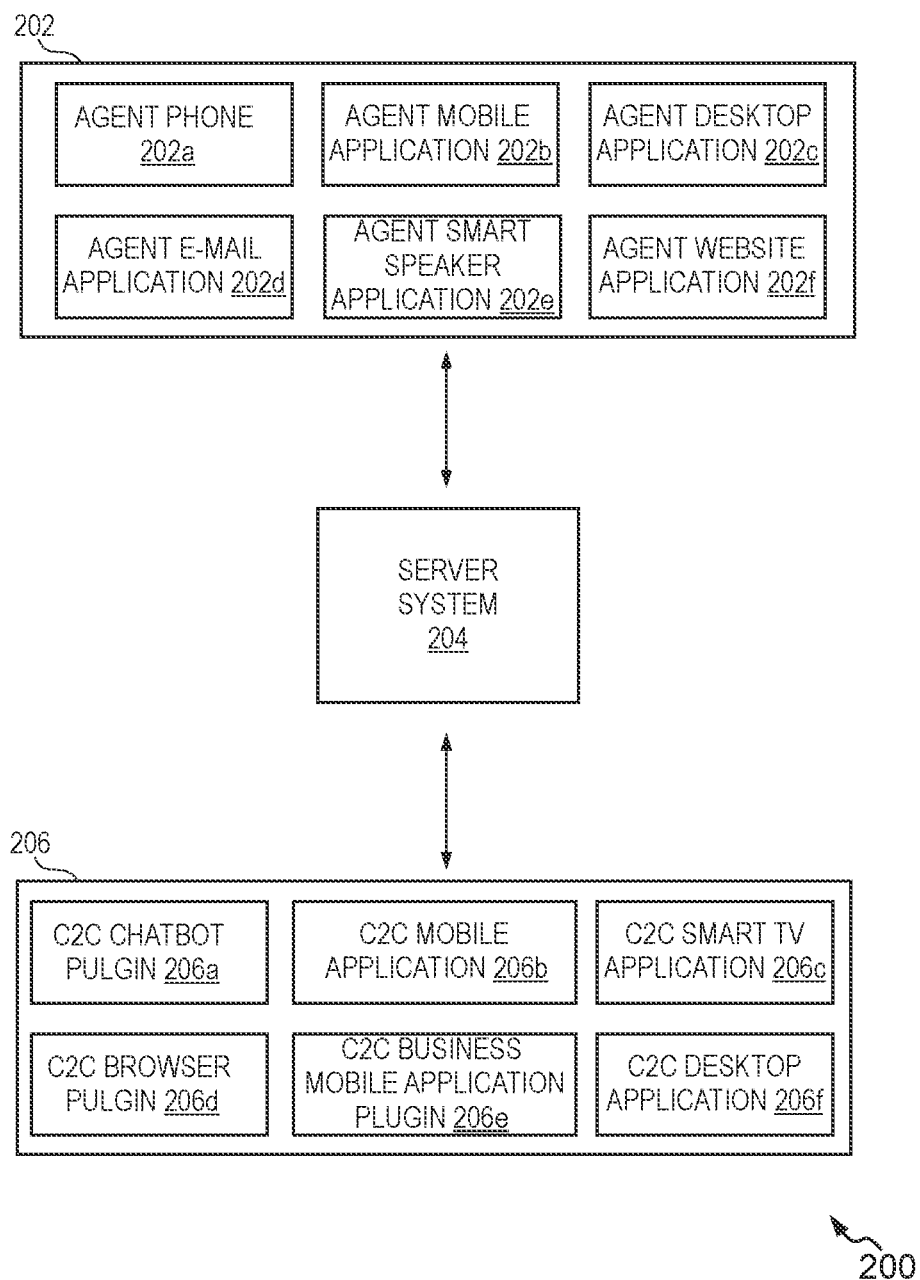
FIG. 2A is a block diagram for representing examples of multiple communication points, in accordance with an embodiment of the present disclosure.

FIG. 2A is a block diagram 200 of representing examples of multiple communication points, in accordance with an embodiment of the present disclosure. For example, the communication points may be the first communication point 124 and the second communication point 128 as shown in FIG. 1. FIG. 2A is shown to include a first communication point 202, a server system 204, and a second communication point 206. The first communication point 202 may be similar to the first communication point 124 as described in FIG. 1. Similarly, the server system 204 and the second communication point 206 may be similar to the server system 126 and the second communication point 128, respectively as described in FIG. 1.

In one embodiment, the server system 204 is configured to facilitate a communication session between the first communication point 202 and the second communication point 206 via a dedicated C2C-enabled contact number 118. A purchase request may be initiated by a user such as a first user 102 via a first user device 110, to enable the first user 102 to purchase the dedicated C2C-enabled contact number 118, for facilitating a C2C-enabled account of the first user 102 to receive calls from one or more second users on the dedicated C2C-enabled contact number (the user 102 is hereinafter interchangeably referred to as "first user 102" & the user device 110 is hereinafter interchangeably referred to as "first user device 110).

It is exemplarily shown in FIG. 2A that the first communication point 202 may be one of an agent phone 202a, an agent mobile application 202b, an agent desktop application 202c, an agent email 202d, an agent smart speaker 202e, an agent website application 202f, and the like. According to an exemplary scenario, for a business entity or a contact center, the context-to-call platform enables a business owner or admin to choose the communication mode(s) accessible for the agent or customer representative. Some exemplary scenarios of the communication modes accessible by the agent are described below as follows:

Web Browser: For a web browser, the context-to-call feature is incorporated as a browser plugin that is configured to seamlessly connect users and business entities or contact centers. The context-to-call platform requires the users to register in order to utilize all features of the context-to-call plugin and the information is stored on a cloud server hosted by the server system 204. The users' information and business/contact center information may be stored in a third-party computing cloud platform such as, but not limited to, Microsoft Azure. In an alternate embodiment, where the database is residing on the user's premise such as the user device, the information may be stored locally at the user device. Then, the server system 204 will just be getting access to their database remotely. The plugin supports:

a voice call, a video call, and an instant message from the browser to a context-to-call feature-enabled website, mobile application, desktop application, and a smart speaker.

a Text SMS from the browser to a mobile device.

an Email from the browser to an email application.

Voice: Smart speakers that are available in the art may be incorporated with a context-to-call feature that enables cross-channel and cross-speaker communication to help business entities gain an edge over their competitors.

Further, the plugin on the chatbot may be configured to capture the following information (a) context of the interaction, (b) data from site analytics, (c) user-specific details such as phone number, email, etc. The logged information is collected and sent to the business entity or contact center for an expedited response. Such features of the server system 204 are described in detail in FIG. 2B.

Website (Corresponding to the agent website application 202f): The context-to-call feature incorporated at the second communication point 206 provides the following communicative features to the agent's mobile device:

A voice Call, a video call, and an instant message received from the Web Browser, Business Website, Chabot, context-to-call/business mobile application, Smart Speaker to context-to-call Website Context-To-Call Business Mobile Application (Android™ &IOS™) (Corresponding to the agent mobile application 202b): The context-to-call business application provides an additional communication channel for a business entity. Particularly, in cases of a chatbot conversation, where the users are directed to an agent. The context-to-call plugin provides the options to communicate through the chat by selecting the "Click-to-Voice Call" or "Click-to-Video Call" or "Click-to-SMS", or "Click-to-Mail" functionality for registered users. The icons are enabled on the chatbot conditional to the availability of the agent based on the time or type of the issue and if the business user or admin has opted for the feature. The plugin supports:

1. iOS™ APP

Voice Calls, video calls, and instant messages received from the Web Browser, Business Website, Chabot, context-to-call/business mobile app, Smart Speaker to iOS context-to-call/business app.

2. Android™

Voice Calls, video calls, and instant messages received from the Web Browser, Business Website, Chabot, context-to-call/business mobile app, Smart Speaker to an android context-to-call/business app.

3. Desktop

Voice Calls, video calls, and instant messages received from the Web Browser, Business Website, Chabot, Context-To-Call/business mobile app, Smart Speaker to Context-To-Call desktop application.

4. Voice

Voice Calls, video calls, and instant messages received from the Web Browser, Business Website, Chabot, Context-To-Call/business mobile app, Smart Speaker to a Voice Assistant.

Similarly, it is exemplarily shown in FIG. 2A that the second communication point 206 may be one of a C2C chatbot plug-in 206a, a C2C mobile application 206b, a C2C smart TV application 206c, a C2C browser plug-in 206d, a C2C business mobile application plug-in 206e, a C2C desktop application 206f, and the like.

Some exemplary scenarios of the second communication point 206 are described below as follows:

Web or App-based Chatbot (Corresponding to C2C chatbot plug-in 206a): In case of a chatbot communication, the context-to-call feature may be configured to act as an intelligent connector. Further, the chatbot may communicate with multimodal conversion databases. Further, the context-to-call feature is incorporated as a plugin that provides the options to communicate through the chat by selecting the "Click-to-Voice Call" or "Click-to-Video Call" or "Click-to-SMS", or "Click-to-Mail" functionality provided therein. The icons may be enabled on the chatbot conditional to the availability of the agent based on the time or type of the issue and if the business user or admin has opted for the feature. The plugin supports:

- a voice call, a video call, and an instant message from a chatbot to a context-to-call feature-enabled website, mobile application, desktop application and a smart speaker.
- A text SMS from a chatbot to a mobile device.
- An email from a chatbot to an email application.

iOS™ Application

- a voice call and a video call from the iOS context-to-call business application to a context-to-call feature-enabled website, mobile application, desktop application, and a smart speaker.
- an instant message enabled from the iOS™ context-to-call business application to a context-to-call feature-enabled website, mobile application, desktop application, and a smart speaker.

Android™ Application

- a voice call and a video call from the android context-to-call business application to a context-to-call feature-enabled website, mobile application, desktop application, and a smart speaker.
- an instant message enabled from the android context-to-call business application to a context-to-call feature-enabled website, mobile application, desktop application, and a smart speaker.

Figure 2B:
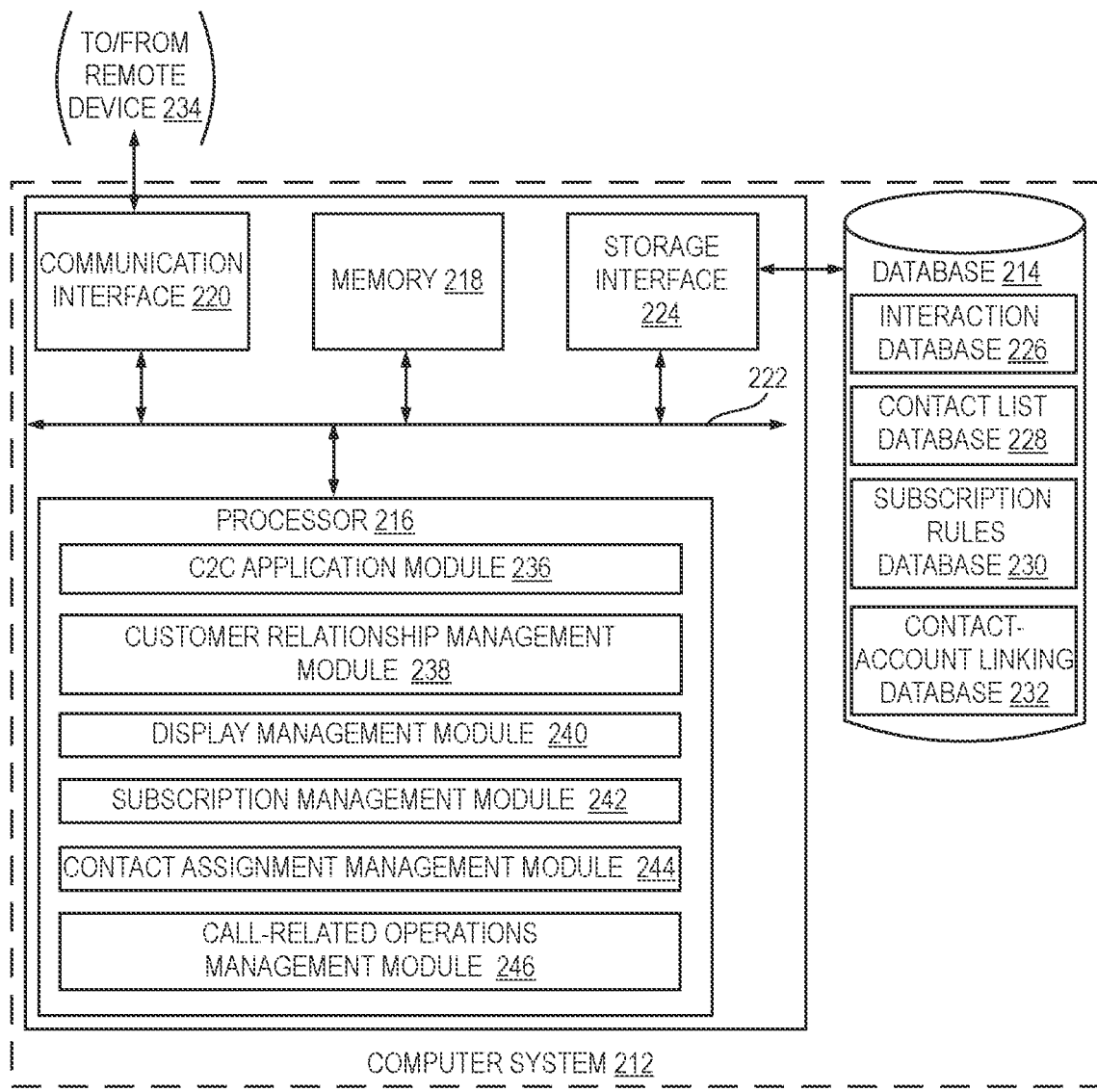
FIG. 2B is a simplified block diagram of a server system, in accordance with an embodiment of the present disclosure.

FIG. 2B is a simplified block diagram of a server system 210, in accordance with an embodiment of the present disclosure. For example, the server system 210 is similar to the server system 126 as described in FIG. 1. In some embodiments, the server system 210 is embodied as a cloud-based and/or SaaS-based (software as a service) architecture. The server system 210 is configured to facilitate communication between the first communication point 202 and the second communication point 206 of FIG. 2A via the dedicated C2C-enabled contact number 118. In one embodiment, the server system 210 includes a computer system 212 and a database 214. The computer system 212 includes at least one processor 216 for executing instructions, a memory 218, and a communication interface 220. The one or more components of the computer system 212 communicate with each other via a bus 222.

In one embodiment, the database 214 is integrated within the computer system 212. For example, the computer system 212 may include one or more hard disk drives as the database 214. A storage interface 224 is any component capable of providing the processor 216 with access to the database 214. The storage interface 224 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 216 with access to the database 214. In one embodiment, the database 214 may include an interaction database 226, a contact list database 228, a subscription rules database 230, and a contact-account linking database 232. In another example embodiment, the database 214 may also include a multimodal conversion database (not shown in FIG. 2B).

The processor 216 includes suitable logic, circuitry, and/or interfaces to execute computer-readable instructions for facilitating communication between the first communication point 202 and the second communication point 206, via the dedicated C2C-enabled contact number 118. Examples of the processor 216 include, but are not limited to, an application-specific integrated circuit (ASIC) processor, a reduced instruction set computing (RISC) processor, a complex instruction set computing (CISC) processor, a field-programmable gate array (FPGA), and the like. The memory 218 includes suitable logic, circuitry, and/or interfaces to store a set of computer-readable instructions for performing operations. Examples of the memory 218 include random-access memory (RAM), read-only memory (ROM), a removable storage drive, a hard disk drive (HDD), and the like. It will be apparent to a person skilled in the art that the scope of the disclosure is not limited to realizing the memory 218 in the server system 210, as described herein. In some embodiments, the memory 218 may be realized in the form of a database server or cloud storage working in conjunction with the server system 210, without deviating from the scope of the present disclosure.

The processor 216 is operatively coupled to the communication interface 220 such that the processor 216 is capable of communicating with a remote device 234 such as, the first user device 110, the first communication point 202, a second user device 114 associated with a second user 106, the second communication point 206 or with any entity connected to the network 132 (e.g., as shown in FIG. 1). In one embodiment, the processor 216 is configured to facilitate a context-to-call application on the first user device 110 and the second user device 114 for enabling a plurality of functionalities to the devices described in the disclosure (the user 106 is hereinafter interchangeably referred to as "second user 106" & the user device 114 is hereinafter interchangeably referred to as "second user device 114").

It is noted that the server system 210 as illustrated and hereinafter described is merely illustrative of an apparatus that could benefit from embodiments of the present disclosure and, therefore, should not be taken to limit the scope of the present disclosure. It is noted that the server system 210 may include fewer or more components than those depicted in FIG. 2B.

In one embodiment, the processor 216 includes a C2C application module 236, a customer relationship management (CRM) module 238, a display management module 240, a subscription management module 242, a contact assignment management module 244, and a call-related operations management module 246. The C2C application module 236 is configured to provide the C2C application onto the first user device 110 and the second user device 114. The C2C application on the first user device 110 and the second user device 114 may be different with corresponding functionalities for the users and the business representatives or agents. The C2C application may be completely downloaded onto the first user device 110 and the second user device 114 or in some embodiments, the C2C application may be remotely operated on the first user device 110 and the second user device 114 via the C2C application module 236. In some embodiments, the C2C application may be provided as a cloud-based service onto the first user device 110 and the second user device 114.

According to an embodiment, the contact center system or business manages resources (e.g., personnel, computers, and telecommunication equipment) to enable the delivery of services via telephone or other communication mechanisms. Such services may vary depending on the type of contact center and may range from customer service to help desk, telemarketing, order taking, and the like. Customers, potential customers, or other users desiring to receive services from the contact center or business may initiate communication through multiple communication modes to the contact center via the first user device 110. The first user device 110 may be a communication device conventional in the art, such as, for example, a telephone, wireless phone, smartphone, personal computer, electronic tablet, and/or the like. Users operating the end user devices may initiate, manage, and respond to telephone calls, emails, chats, text messaging, web-browsing sessions, and other multi-media transactions.

In an embodiment, the context-to-call application module 236 acts as a single communication channel for connecting the user devices to a contact center through the first communication point 202 and the second communication point 206 via the dedicated contact number 118. User devices are configured to support the first communication point 202, and the first communication point 202 is equipped to include a context-to-call feature, attribute, characteristic, and the like capable of communicating over the network 132 to a context-to-call application module 236.

In one embodiment, the server system 210 is configured to facilitate adding one or more user devices to a communication session that is already initiated between two user devices such as 110 and 116. One or more user devices may be added by any of the two users via the first communication point 202 or the second communication point 206 for creating a conference call. Further, multiple users present in the conference call may be allowed to communicate with each other via the respective communication points and the respective dedicated C2C-enabled contact numbers.

The first communication point 202 may be for example, but is not limited to, an agent phone, an agent mobile application, an agent desktop application, an agent email, an agent smart speaker, and the like as described earlier.

According to an embodiment, the processor 216 may be configured to facilitate the initiation of a communication session between the first communication point 202 and the second communication point 206, while the first communication point 202 is incorporated at the business entity or contact center.

In an embodiment, the processor 216 is configured to generate a unique ID when a business user or a contact center signs up for context-to-call service. The generated unique ID is used for authenticating the context-to-call service requests received from the first communication point 202.

The C2C application module 236 is configured to facilitate a plurality of users to create their account (email and password) on the C2C application downloaded on their user devices. The plurality of users may provide profile information to the application which may be stored under the user profile section. The user profile information will have a unique ID that will be stored on the C2C application, but the consumer data will be reflected on the second communication point 206 for understanding the customer better. With this, the customer representative or the agent may not be required to ask the user about regular consumer data. The representative/agent can directly start helping and solving the queries, having the consumer data already.

In one embodiment, the data related to the users will be specific, but not limited to, age, location, demographic, likes and dislikes, areas of interest, social media, educational background, unique identification number or personal information. Further, the user will be provided with options to hide the data if needed. In additional embodiments, financial information associated with the user such as recent payment details, and payment option details, may be fetched from various sources such as consumer accounts on 3rd party platforms, etc.

In an embodiment, the second communication point 206 may be for example, but not limited to, a chatbot plug-in, a mobile application, a smart appliance, a browser plug-in, a browser mobile application plug-in, a desktop application, and the like as described earlier. The processor 216 is configured to facilitate communications and exchange of data between the users, the context-to-call application, the communication points 202 and 206, and the first user device 110 at the contact center or business entity.

The server system 210 may include the interaction database 226 that stores the user data and profile information of all the users such as the second user. The profile information of the user may include an email address, first name, last name, phone number, unique ID/username, etc. The user data may include various interaction data collected by the server system 210 during the usage of the C2C application by the users. The users may exclusively choose what profile information to be displayed at the second communication point 206.

Further, in the case of the business or contact center, the interaction database 226 stores the business profile information such as business email address, various department phone numbers, or location addresses associated with a plurality of business entities. The business entity or contact center user may choose the profile information to be accessible to the public.

In an embodiment, the server system 210 may include a customer relationship management (CRM) module 238 configured to maintain historical data corresponding to an end-user, wherein the historical data includes information on prior interactions between the users and the business entity or contact center for enhanced retention of customers of a business entity or contact center.

Further, the server system 210 may include the contact list database 228 configured to store a plurality of contact numbers. In an example embodiment, the plurality of contact numbers is generated through a third-party communication facilitating platform. For example, the third-party communication facilitating platform may be a TWILIO platform. Upon generating the plurality of contact numbers, the plurality of contact numbers is stored in the contact list database 228.

The server system 210 also includes a display management module 240 configured to facilitate the first user device 110 and the second user device 114 to display at least one of, but not limited to, the predetermined list of contact numbers 134, a contact number selected by the first user, a C2C-enabled account of the first user and the second user, and the like. The display management module 240 may be also configured to facilitate the first user device 110 and the second user device 114 to display the output of the one or more operations implemented by the C2C-enabled account of the first user and the second user.

In an exemplary embodiment, the database 214 may also include a business rules database (not shown in FIG. 2B) configured to store a plurality of business rules. In an example embodiment, the plurality of business rules is applied to determine whether to initiate communication sessions and control the customer interactions with the contact center or business entity. The business rules may include terms and conditions that may filter out spam calls and fake complaints coming to the contact centers.

In an embodiment, the database 214 may include the subscription rules database 230 configured to store a plurality of subscription rules. In an example embodiment, the plurality of subscription rules is applied to determine whether to accept the subscription fees or not. The subscription rules may include terms and conditions that the payment received is genuine or fraudulent.

Moreover, the server system 210 includes a subscription management module 242 configured to facilitate the first user device 110 to provide one or more options for subscription plans. The first user may select one of the one or more options and make the payment for corresponding subscription fees. Thus, the subscription management module 242 is further configured to receive a subscription fee paid by the first user using the first user device 110.

The database 214 further includes the contact-account linking database 232 that is configured to store details about a list of accounts having a contact number linked to them. The server system 210 further includes a contact assignment management module 244 configured to facilitate assigning the contact number selected by the first user to the C2C-enables account of the first user, as a dedicated C2C-enabled contact number. Basically, the contact assignment management module 244 is configured to establish a link between the contact number selected by the first user and the C2C-enabled account of the first user. Upon linking, details of the C2C-enabled account having the contact number linked to it is updated in the contact-account linking database 232.

In an embodiment, where the first user has to pay the subscription fees for purchasing a contact number, which enables their C2C-enabled account to receive calls from other users, the server system 210 is configured to facilitate a C2C-enabled account of the first user and the second user to implement one or more operations. The one or more operations may include call forwarding, call recording, reviewing call history and logs, adding/editing/deleting a contact number from a contact list, etc. The processor 216 may utilize the call-related operations management module 246 to enable such one or more operations.

In an embodiment, the database 214 may also include the multimodal conversion database. The multimodal conversion database may include a plurality of pre-defined set of interaction data that may be used to perform interpretation and translate messages conveyed between the first and second user devices.

Further, the processor 216 is configured to generate different kinds of reports. The reports may be used to train the agents and improve the services to serve the users better. In an embodiment, the processor 216 may include reports generating module (not shown in FIG. 2B) configured to generate a plurality of reports. The reports described below are associated with the calls made by the second user to the first user device 110. Here the call is referred to as audio, video, text, email, or any kind of communication carried out between the first and the second communication points 202 and 206. The reports generated include but not limited to:

Channel Engagement Report—This report represents the end-user engagement channel usage.

Context Detail Report—This report represents the count based on the context usage.

Call Duration Report—This report represents the call duration and number of calls made and/or received.

Context Duration Report—This report represents the contact duration for each context.

Call Response Report—This report represents the call responses, and shows the status of the number of calls connected, dropped, busy, and/or abandoned.

SMS Response Report—This report represents the SMS response, and shows the status of the SMS responded, delivered, not delivered and/or abandoned.

Context-Channel Report—This report represents a comparative representation of the type of channel used for each context.

Originator location—This report includes the details of the end-user location.

Call Recording—This report will provide a call recording of the conversation that happens between the customer and the representative. Here the call is referred to as video, text, email, or any kind of communication between two communication points.

Call forwarding—This report will provide a list of contacts of customers that were forwarded to a different contact number of agents.

Contact list—This report will provide a list of contacts that are available for the first user to purchase so that the corresponding contact number can be used by the first user to receive calls from customers. Here, the first user is an agent.

Contact assignment list—This report will provide a list of contacts linked to one or more C2C-enabled accounts of one or more first users respectively.

Figure 3:
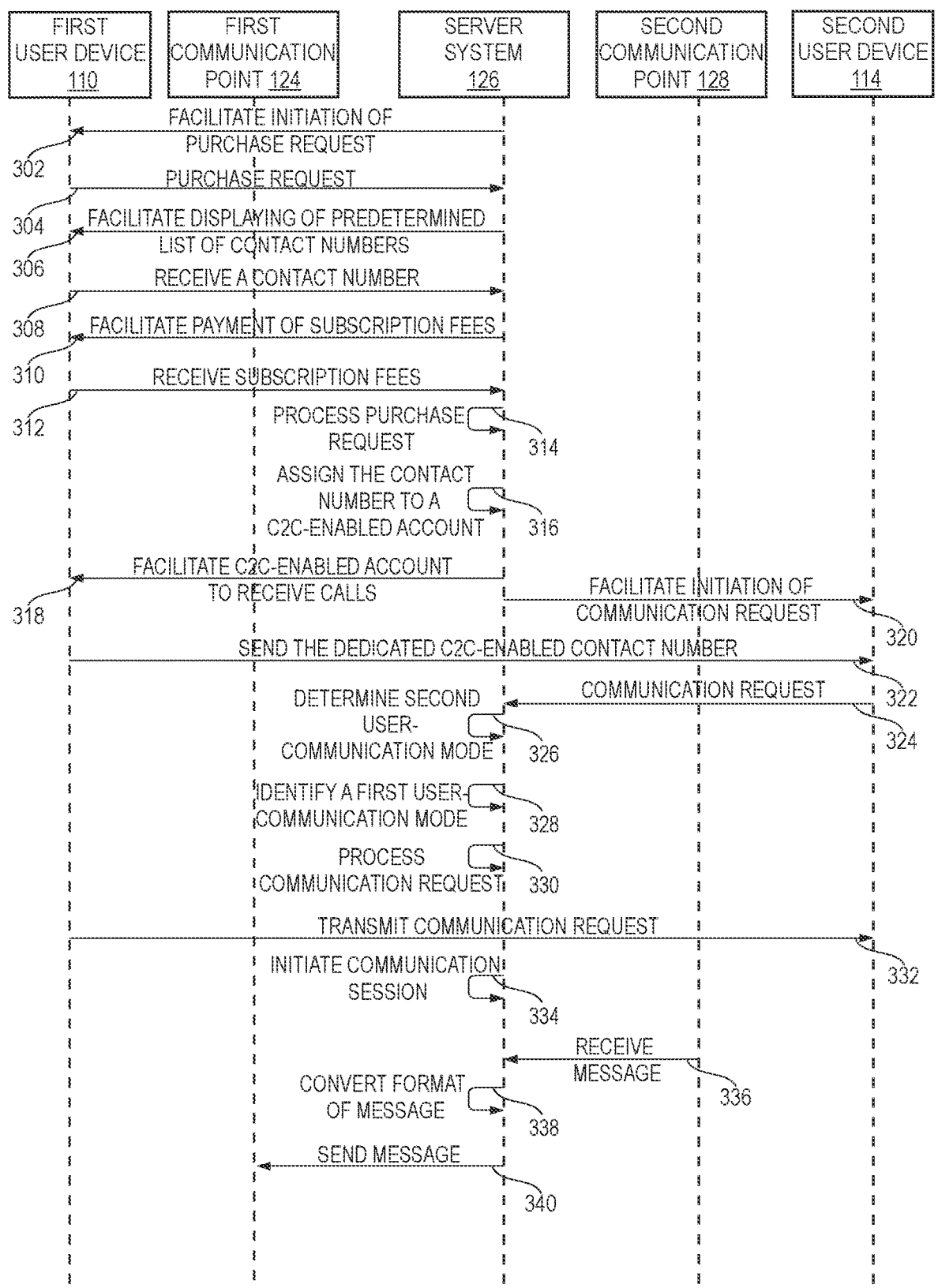
FIG. 3 is a sequence flow diagram for facilitating a communication session between two communication points via a context-to-call-enabled contact number, in accordance with an embodiment of the present disclosure.

FIG. 3 is a sequence flow diagram 300 for facilitating a communication session between two communication points (the first communication point 124 and the second communication point 128) via the dedicated context-to-call-enabled contact number 118, represented in accordance with an example embodiment of the present disclosure. The communication session is facilitated via the server system 126 when the first user 102 initiates a purchase request from the first communication point 124. The first user 102, the first communication point 124, the server system 126, and the second communication point 128 are described with reference to FIG. 1.

At 302, the server system 126 facilitates the first user 102 to initiate a purchase request using a first user device 110. The purchase request may be for facilitating the first user to purchase a dedicated contact number and assign the same to a C2C-enabled account of the first user, and for communication request may be for enabling the C2C-enabled account of the first user to receive calls from one or more second user devices. Further, this enables starting of a communication session between the first communication point 124 and the second communication point 128. In an embodiment, the first user device 110 may be facilitated to download the C2C application provided by the server system 126. The C2C application may include a plurality of options that facilitates the first user 102 to purchase a contact number.

At 304, the server system 126 receives a purchase request from the first user device 110, through the first communication point 124. The purchase request may be initiated using the C2C application. The first communication point 124 may be one of, but not limited to, an agent phone, a C2C agent mobile application, a third party agent mobile application, a C2C agent desktop application, a third party agent desktop application, an agent email, an agent smart speaker, a C2C agent website application, and a third party agent website application.

At 306, the server system 126 facilitates displaying a predetermined list of contact numbers on a UI presented on the first user device 110. Prior to displaying the predetermined list of contact numbers, the contact numbers may have to be generated which is done through the third-party communication facilitating platform.

At 308, the server system 126 receives the contact number selected by the first user. The contact number may be in any pre-defined format, generally suitable to be used in a particular geographical location. For the pre-defined format may be a United States (US)-based format in the US, an Indian-based format in India, and/or the like.

At 310, the server system 126 facilitates payment of the subscription fees. In an example, multiple options for subscription fees may be displayed on a UI presented on the first user device 110. The first user may choose one based on their requirements and purchase the same by making the payment of the subscription fees. Upon choosing the contact number, the first user may also have to choose a subscription plan and make the payment accordingly.

At 312, the server system 126 receives subscription fees paid by the first user. The subscription fees may include a predefined amount based on a subscription plan selected by the first user. In an example, the subscription plan may be a basic subscription plan, a premium subscription plan, an unlimited subscription plan, and/or the like.

At 314, the server system 126 processes the purchase request. The purchase request is processed based, at least in part, on receiving the subscription fees from the first user device 110 for facilitating purchasing of the contact number selected by the first user.

At 316, the server system 126 assigns the contact number to a C2C-enabled account of the first user as the dedicated C2C-enabled contact number 118. The server system 126 basically, links the contact number selected by the first user to the C2C-enabled account of the first user.

At 318, the server system 126 facilitates the C2C-enabled account of the first user to receive calls from one or more second user devices. The one or more second user devices may be associated with one or more second users who can initiate a communication session with the first user, upon making a call on the dedicated C2C-enabled contact number 118 of the first user.

At 320, the server system 126 facilitates initiation of a communication request from the second user device 114 associated with the second user via the second communication point 128. The communication request may be initiated using one of, but not limited to, a C2C chatbot plug-in 206a, a C2C mobile application 206b, a C2C smart TV application 206c, a C2C browser plugin 206d, C2C business mobile application plugin 206e, and C2C desktop application 206f. The second user 102 may select a communication mode during the initiation process such as a video call, voice call, voice note, IM, short message service (SMS), email, etc. In some embodiments, a third-party different chatbot application (not shown in the figures) may be used as the second communication point 128.

At 322, the server system 126 sends the C2C-enabled contact number of the first user to the second user device 114 via the first communication point 124 and the second communication point 128.

At 324, the server system 126 receives the communication request from the second user device 114.

At 326, the server system 126 determines a second user-communication mode for communication, selected by the second user device 114. The second communication mode may be of a video call, an audio call, an email, or the like.

At 328, the server system 126 identifies a first communication mode for communication. The first communication mode for communication may be selected by the first user device 110. The first communication mode may be one of a video call, an audio call, an email, or the like.

At 330, the server system 126 processes the communication request based on a matching between the first communication mode and the second communication mode. The server system 126 may simply initiate the communication request without any mode conversion if the first communication mode and the second communication modes are the same. In cases where the first and second communication modes are different, the server system 126 may perform mode conversions and facilitate communication sessions between the first communication point 124 and the second communication point 128.

At 332, the server system 126 transmits the communication request from the second user device 114 through the second communication point 128 to the first user device 110 through the first communication point 124. At 334, the server system 126 may initiate a communication session between the first user device 110 through the first communication point 124 and the second user device 114 through the second communication point 128.

At 336, the server system 126 receives a message from the second communication point 128. In an example, the second communication mode selected by the second user device 114 and the first communication mode selected by the first user device 110 for communication may be an audio call and a text message respectively.

At 338, the server system 126 converts the format of the message in accordance with the first and second communication modes selected by the first and second user devices for communication.

At 340, the server system 126 sends the converted message to the first communication point 124 which may be viewed on the first user device 110 (not shown in FIG. 3), through the first communication point 124. The steps described at 302-340 may also be repeated in the scenarios where the first communication point 124 is sending messages to the second communication point 128 and vice versa.

Figure 4A:
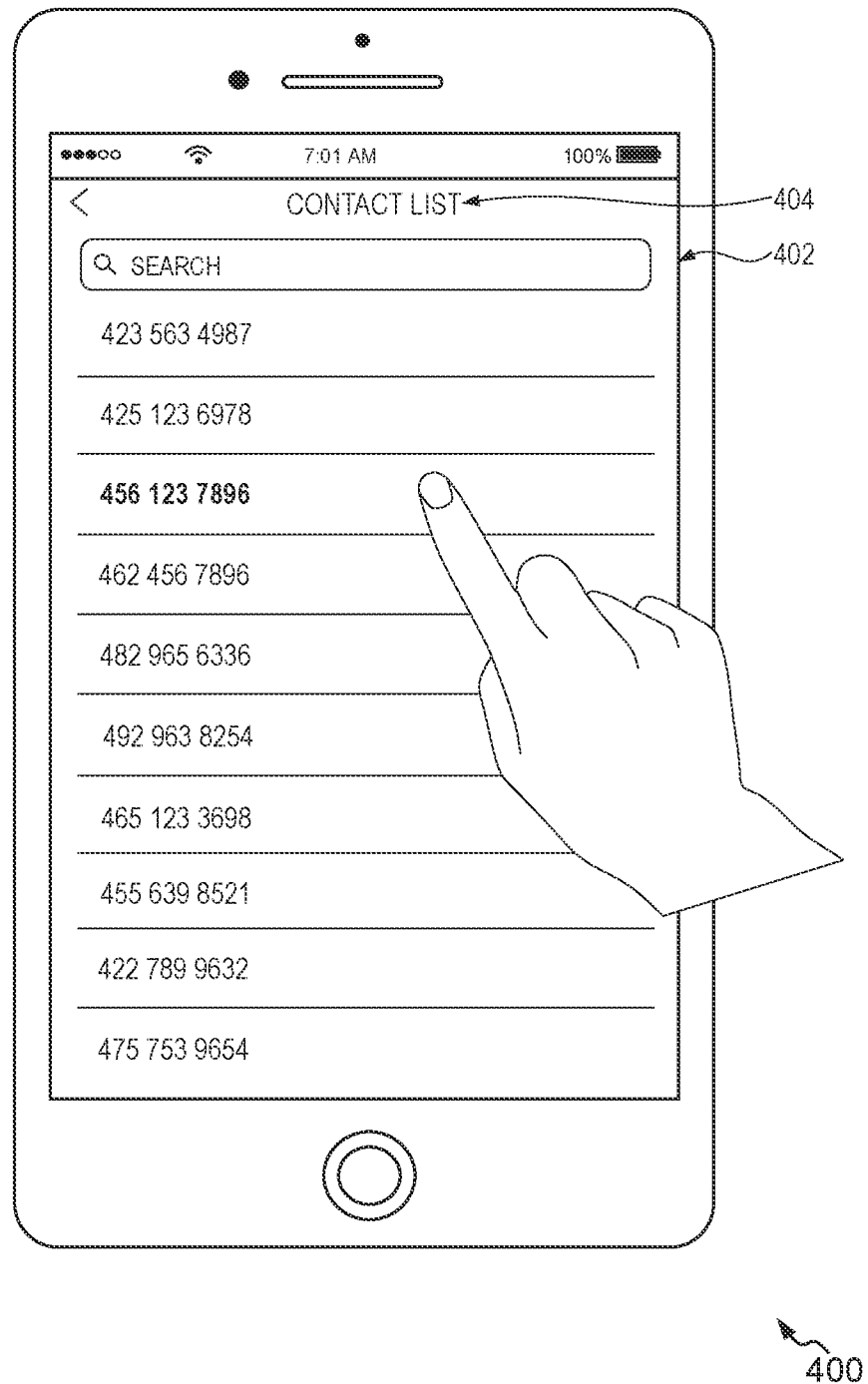
FIG. 4A is a schematic representation of a first user device presenting a user interface (UI) displaying a list of contact numbers, in accordance with an embodiment of the present disclosure.

FIG. 4A is a schematic representation 400 of the first user device presenting a user interface (UI) 402 displaying a list of contact numbers 404, in accordance with an embodiment of the present disclosure. In an example, the first user device may be a mobile phone, and hence, the UI 402 displays the list of contact numbers 404 as shown in FIG. 4A. The first user may select one contact number from the list of contact numbers 404 and purchase the same. The server system 126 is configured to establish a communication session between users via a dedicated C2C-enabled contact number. Here, the dedicated C2C-enabled contact number is the contact number purchased by the first user.

Figure 4B:
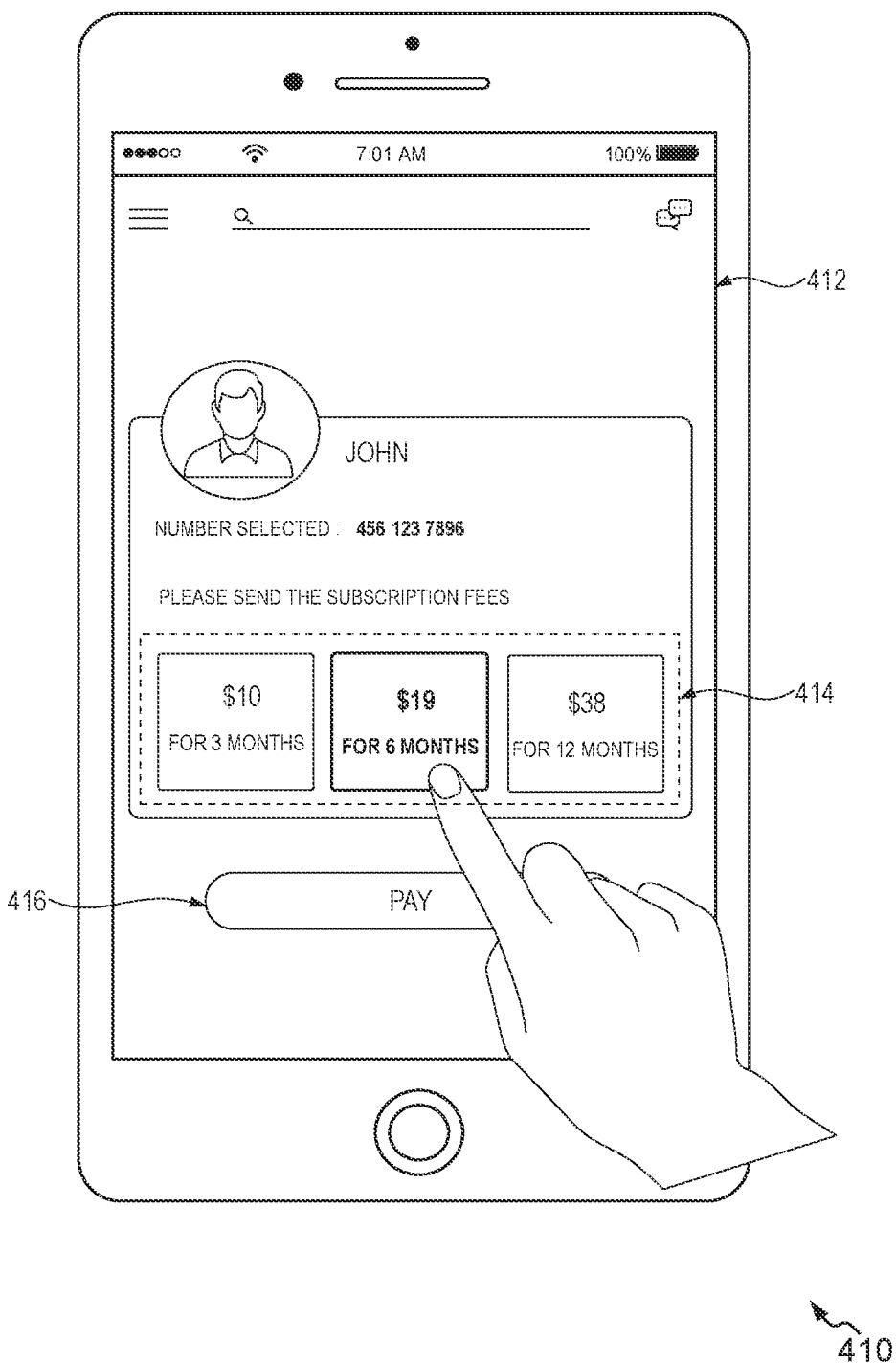
FIG. 4B is a schematic representation of the first user device presenting a UI displaying subscription fees options with a pay button, in accordance with an embodiment of the present disclosure.

FIG. 4B is a schematic representation 410 of the first user device presenting a UI 412 displaying subscription fee options 414 with a pay button 416, in accordance with an embodiment of the present disclosure. Upon choosing the contact number, which the first user is willing to purchase, the first user is directed to the UI 412 displaying the subscription fee options 414. The first user may have to select one option and make the payment by selecting the pay button 416 as shown in FIG. 4B. For example, the subscription fee options 414 may be 10 dollars for three months, 19 dollars for six months, and 38 dollars for 12 months. Upon choosing one and making the payment, the first user may own and use the contact number purchased, for a tenure corresponding to the corresponding subscription plan selected by the first user.

Figure 4C:
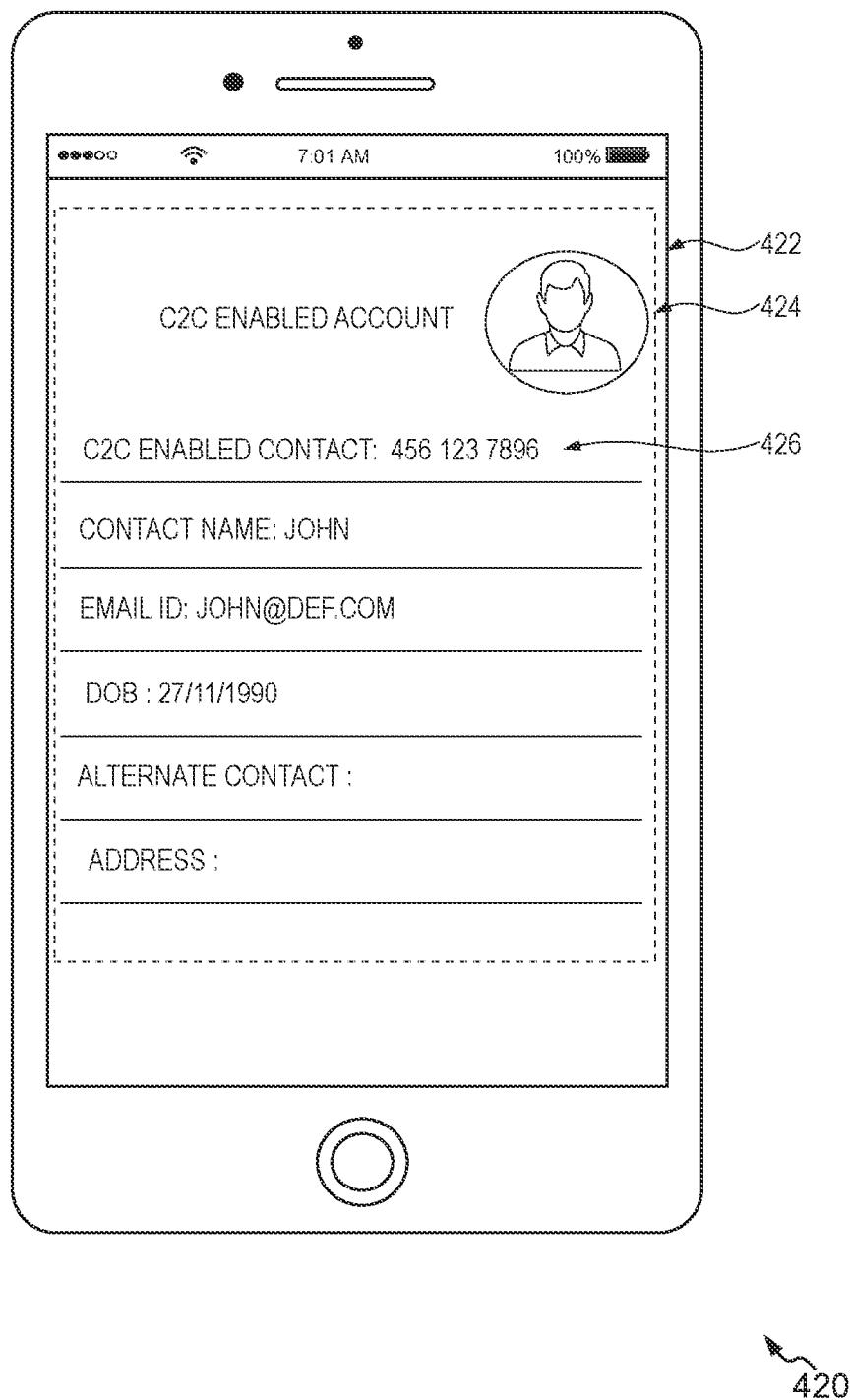
FIG. 4C is a schematic representation of the first user device presenting a UI displaying a context-to-call (C2C)-enabled account of the first user with account details and a dedicated C2C-enabled contact number selected by the first user, in accordance with an embodiment of the present disclosure.

FIG. 4C is a schematic representation 420 of the first user device presenting a UI 422 displaying a C2C-enabled account 424 of the first user with account details and a dedicated C2C-enabled contact number 426 selected by the first user, in accordance with an embodiment of the present disclosure. In an example embodiment, once the first user purchases the contact number, the contact number may be assigned to the C2C-enabled account 424 of the first user as the dedicated C2C-enabled contact number 426 (C2C-enabled contact number as shown in FIG. 4C).

Figure 4D:
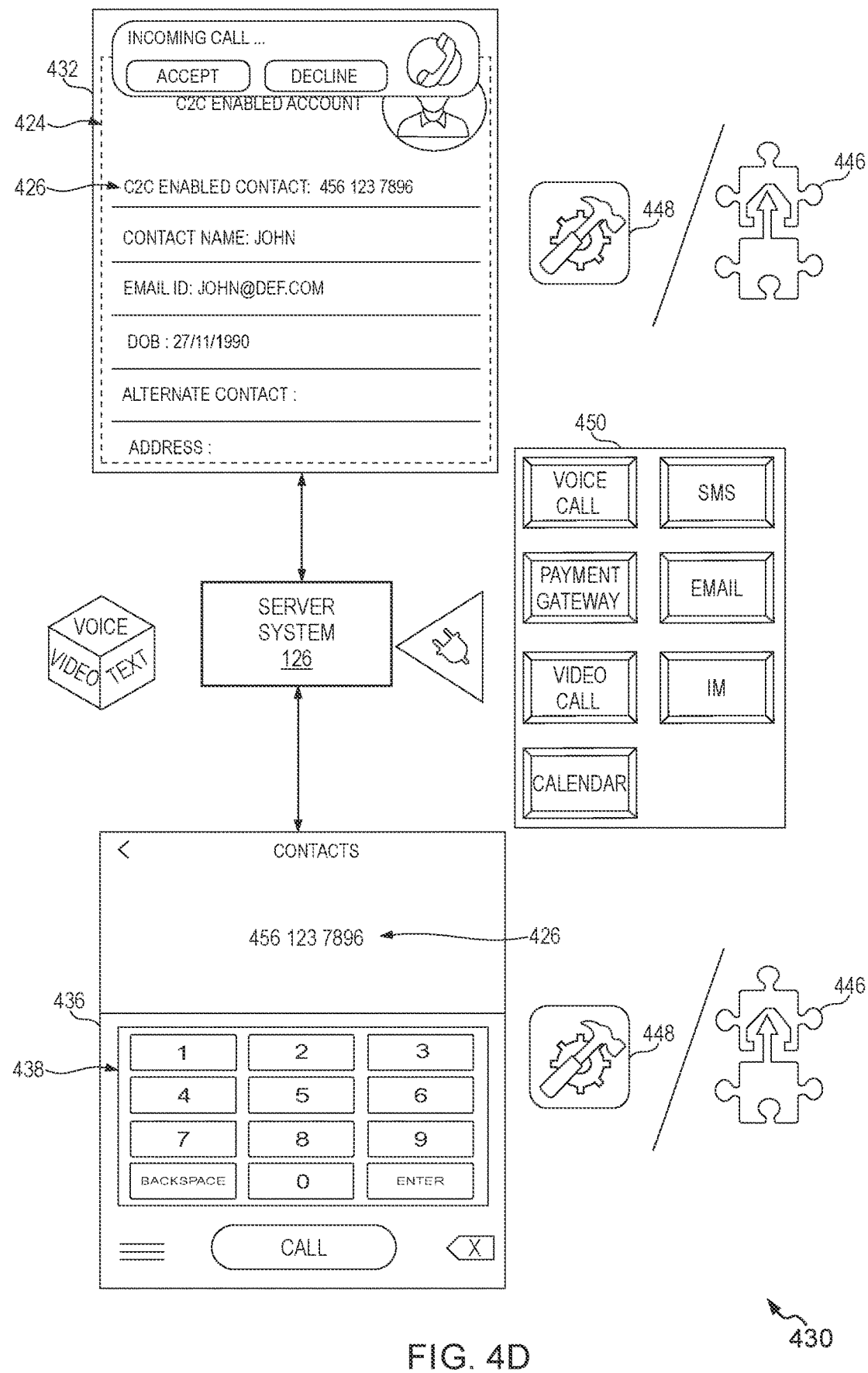
FIG. 4D and FIG. 4E are block diagram representations of possible ways of establishing a communication session between the first user device and the second user device, in accordance with an embodiment of the present disclosure.
Figure 4E:
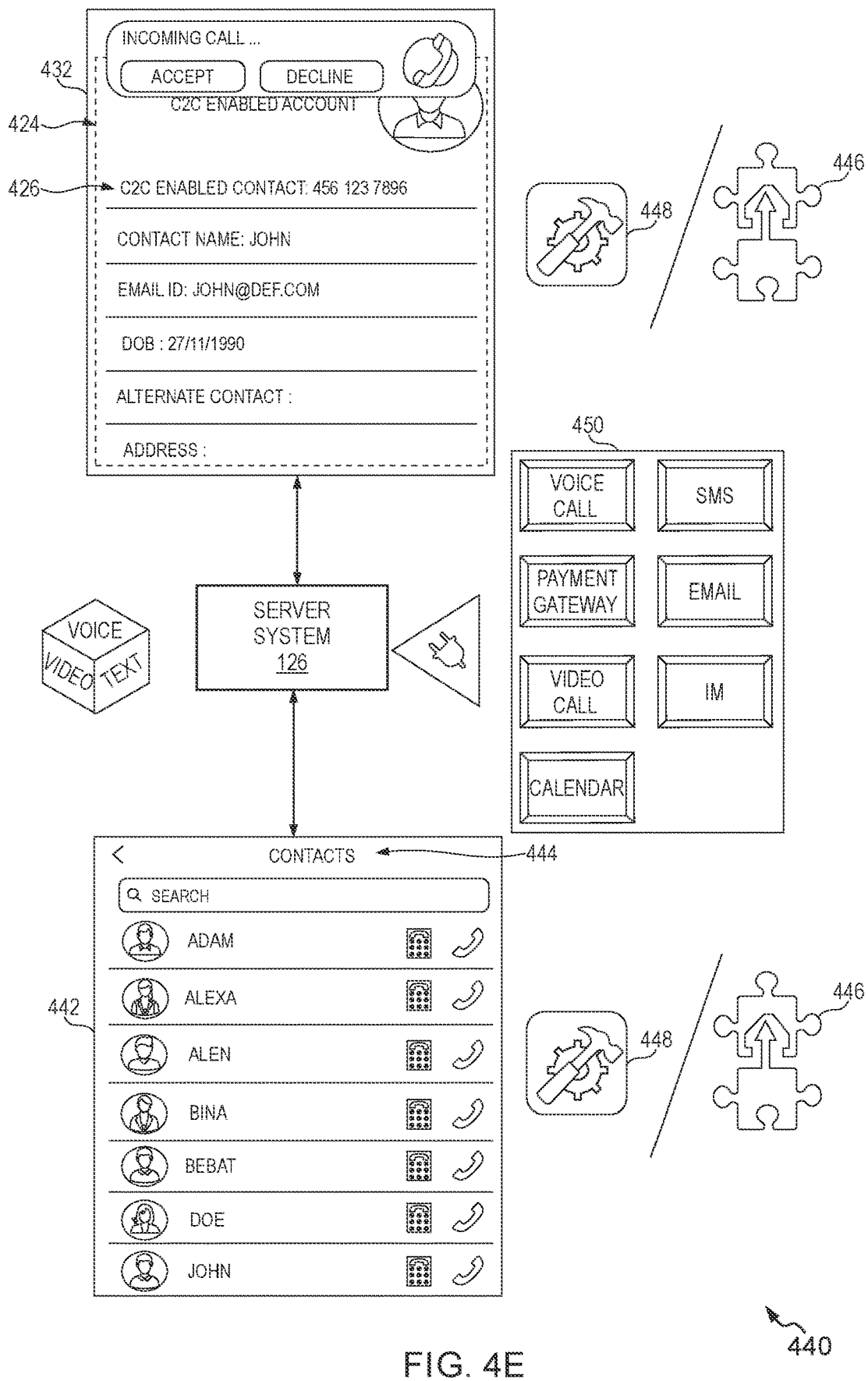

FIG. 4D and FIG. 4E are block diagram representations 430 and 440 of possible ways of establishing a communication session between the first user device 110 and the second user device 114, in accordance with an embodiment of the present disclosure. The first user device 110 is presenting a UI 432 that is displaying a C2C-enabled account 424 of the first user with account details and a dedicated C2C-enabled contact number 426 selected by the first user. It also displays an option of receiving/declining incoming calls. The second user device 114 is presenting a UI conveying the possible ways of establishing the communication session.

FIG. 4D shows the second user device 114 presenting a UI 436 that is displaying a dial pad 438 for the second user to dial the dedicated C2C-enabled contact number 426 of the first user and place the call. FIG. 4E shows the second user device 114 presenting a UI 442 that is displaying a list of contacts 444 personalized to the second user, of which the second user can select one and place the call by dialing the same.

Further, in an embodiment, the possible means of providing the C2C application may include a plugin 446 or settings 448. The plugin 446 indicates that the context-to-call application provided by the server system 126 is integrated with a business entity or a customer entity as software, for example, a website, operating system-based application, and the like. The settings 448 indicate that the context-to-call feature may be developed by the business entity or the customer entity itself. In one embodiment, both the first user device 110 and the second user device 114 may be provided via the plugin 446, or the settings 448. In another embodiment, the first user device 110 may be provided via the plugin 446, and the second user device 114 may be provided via the settings 448 and vice versa.

FIGS. 4D and 4E also show possible means of providing a C2C application to the user devices such as the first user device 110 and the second user device 114. The possible communication modes 450 are exemplarily shown in FIGS. 4D and 4E. In an example, the possible communication modes 450 may be a voice call, video call, audio note, SMS, IM, email, calendar, payment gateway, etc. The first and second user devices may be, but are not limited to, a mobile phone, a smart speaker, a desktop, a smart television, and a laptop.

Figure 5A:
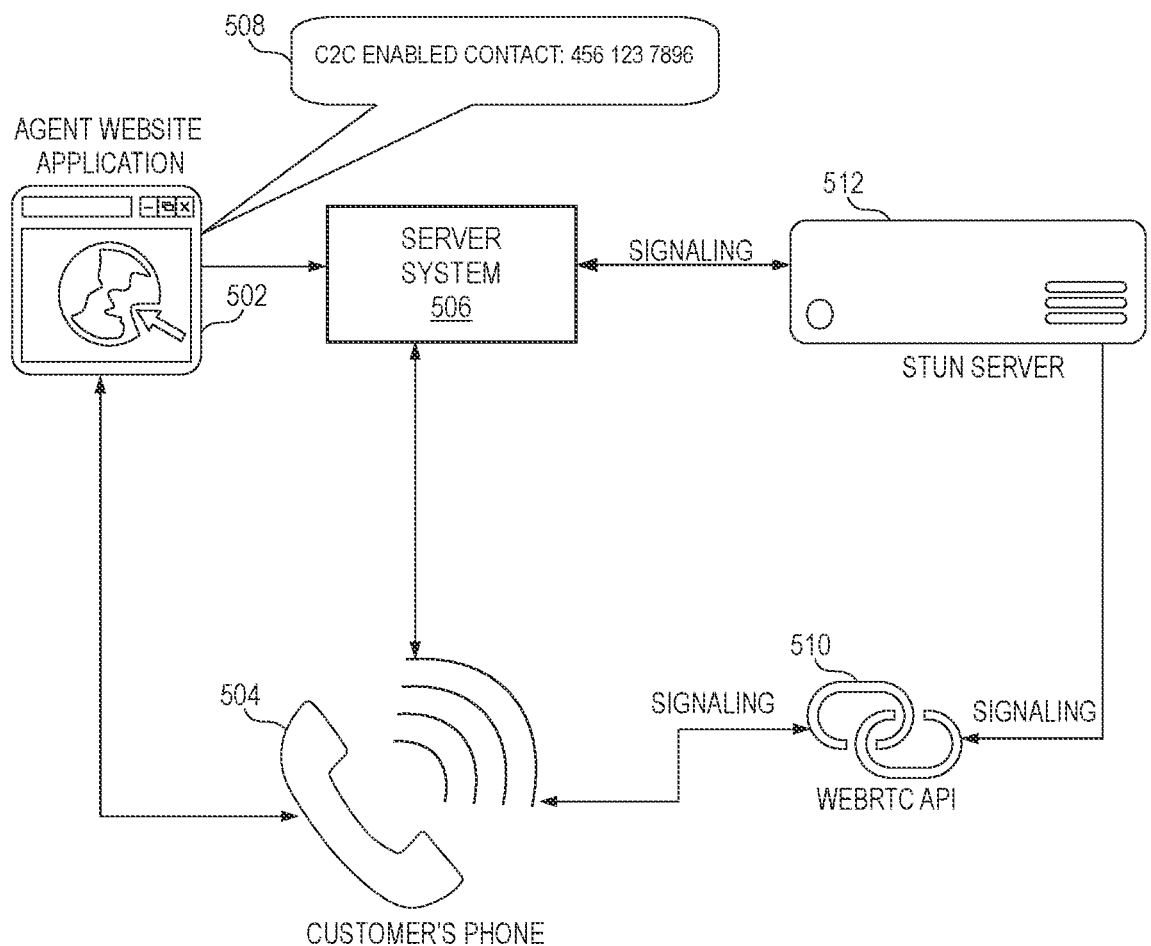
FIG. 5A is a schematic representation depicting a communication between an agent website application and a customer's phone, in accordance with an embodiment of the present disclosure.
Figure 5B:
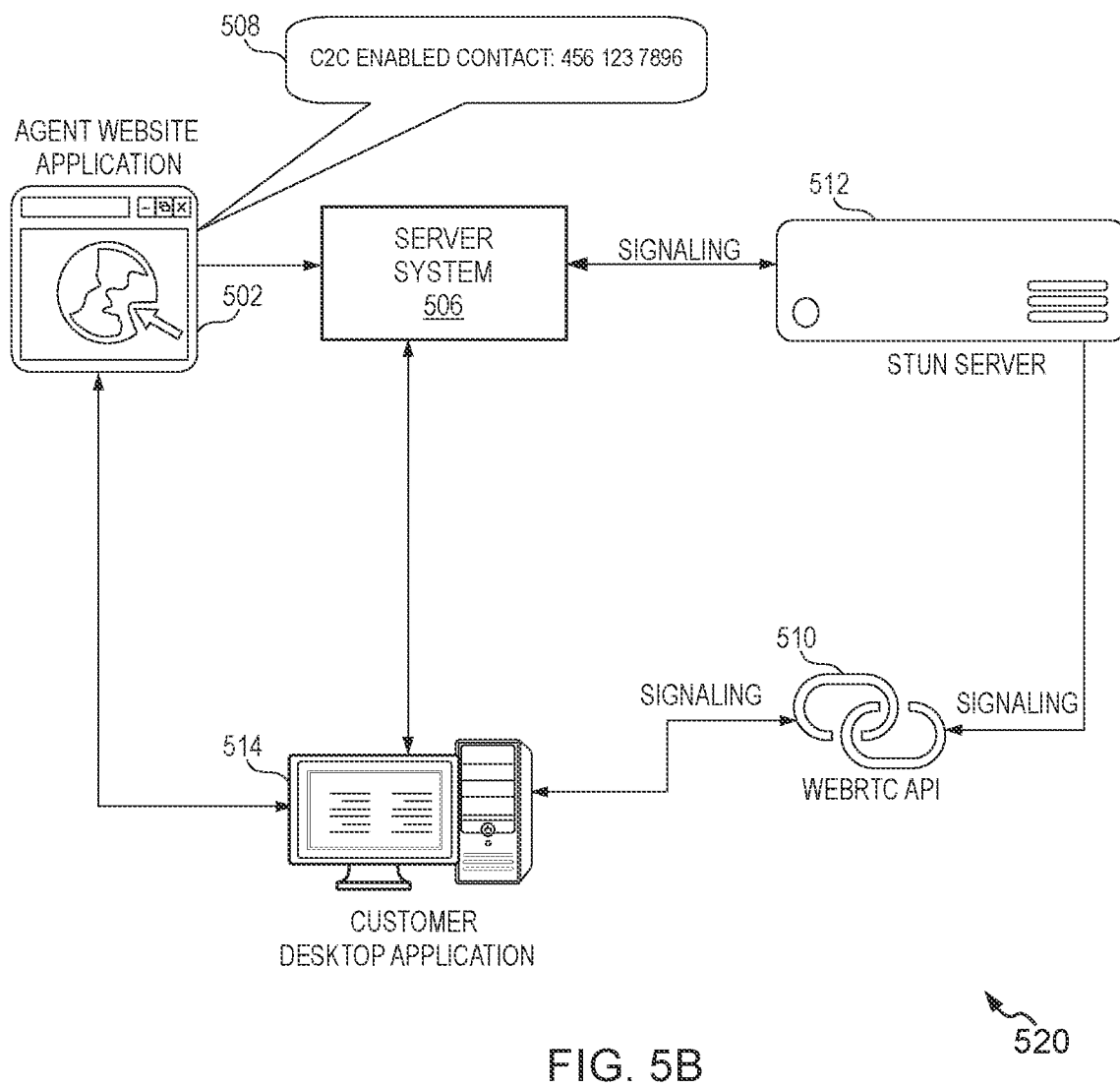
FIG. 5B is a schematic representation depicting a communication between an agent website application and a customer third party browser application, in accordance with an embodiment of the present disclosure.

FIGS. 5A and 5B, collectively, represent example scenario representations 500, and 520 respectively, depicting at least two communications using an agent website application 502 as a first communication point. The two possible scenarios depict an environment of each communication session between a C2C or the agent website application 502 as a first communication point and a customer's phone 504 as a second communication point. A server system 506 is configured to initiate the communication session between a C2C or the agent website application 502 and a second communication point via a dedicated C2C-enabled contact number 508. The second communication point may be one of, but not limited to a customer telephone/landline, a customer mobile application, a customer desktop application, a customer website application, a third-party speaker application, a customer email application, and the like.

FIG. 5A is a schematic representation 500 depicting communication between the agent website application 502 and the customer's phone 504, in accordance with an embodiment of the present disclosure. The server system 506 may facilitate various functionalities based on the communication modes chosen by the users on the agent website application 502 and the customer's phone 504. In an example embodiment, the user associated with the agent website application 502 may initiate a purchase request via a C2C application or an agent third party web application on a user device such as the first user device 110. The server system 506 may facilitate displaying of certain contact numbers on the agent website application 502 associated with the first user device. Format of the contact numbers displayed may be an Indian format. The server system 506 may further receive a contact number selected by the first user, and process the purchase request by receiving a subscription fee paid for purchasing the contact number. Then, the server system 506 assigns the contact number to a C2C-enabled account of the first user as a dedicated C2C-enabled contact number 508, and facilitates the C2C-enabled account of the first user to receive calls from the customer's phone 504.

Further, in an embodiment, the second user initiates a communication request via a C2C application or a customer's phone application on a user device such as the second user device. The second user device corresponds to the customer's phone 504. The server system 506 may determine a second user-communication mode selected by the user on the customer's phone 504 and the first user-communication mode of the agent website application 502. In the example, the second user-communication mode may be a video call and the first user-communication mode may be an audio call. A WebRTC application programming interface (API) 510 is a framework that may be used for real-time communication for web browsers or web plugins. It supports video, voice, and generic data sent between the agent website application 502 and the customer's phone 504. The WebRTC API 510 is an open-source framework available in the art which allows developers to build voice and video communication platforms.

Further, a STUN server 512 may also be utilized by the server system 506 to facilitate the communication session. STUN stands for Session Traversal of User Datagram. This is a standardized network protocol for traversal of network address translator (NAT) which acts as a gateway for applications of real-time voice, video, messaging, and other interactive communication. More particularly, the customer's phone may initiate a voice-over internet protocol (VoIP) using WebRTC API 510 that hits the STUN server 512 which acts as a gateway to carry the call further to agent website application 502.

FIG. 5B is a schematic representation 520 depicting communication between an agent website application 502 and a customer desktop application 514, in accordance with an embodiment of the present disclosure. The customer desktop application 514 may be enabled with the C2C feature. The server system 506 may facilitate various functionalities based on the communication modes chosen by the users on the C2C or the agent website application 502 and the customer desktop application 514. In an example embodiment, the user associated with the C2C or the agent website application 502 may initiate a purchase request via a C2C application or the agent website application 502 on a user device such as the first user device 110. The server system 506 may facilitate displaying of certain contact numbers on the agent website application 502 associated with the first user device. The server system 506 may further receive a contact number selected by the first user, and process the purchase request by receiving a subscription fee paid for purchasing the contact number. Then, the server system 506 assigns the contact number to a C2C-enabled account of the first user as a dedicated C2C-enabled contact number 508, and facilitates the C2C-enabled account of the first user to receive calls from the second user device.

Further, in an embodiment, the second user initiates a communication request via a C2C application or the customer desktop application 514. The server system 506 may determine a second user-communication mode selected by the user on the C2C or the customer desktop application 514 and the first user-communication mode of the agent desktop application 502. In the example, the second user-communication mode may be a video call and the first user-communication mode may be an instant message (IM). The WebRTC API 510 and the STUN server 512 may be utilized by the server system 506 to facilitate the communication session between the C2C or the agent website application 502 and the customer desktop application 514, as discussed in FIG. 5A.

Figure 6:
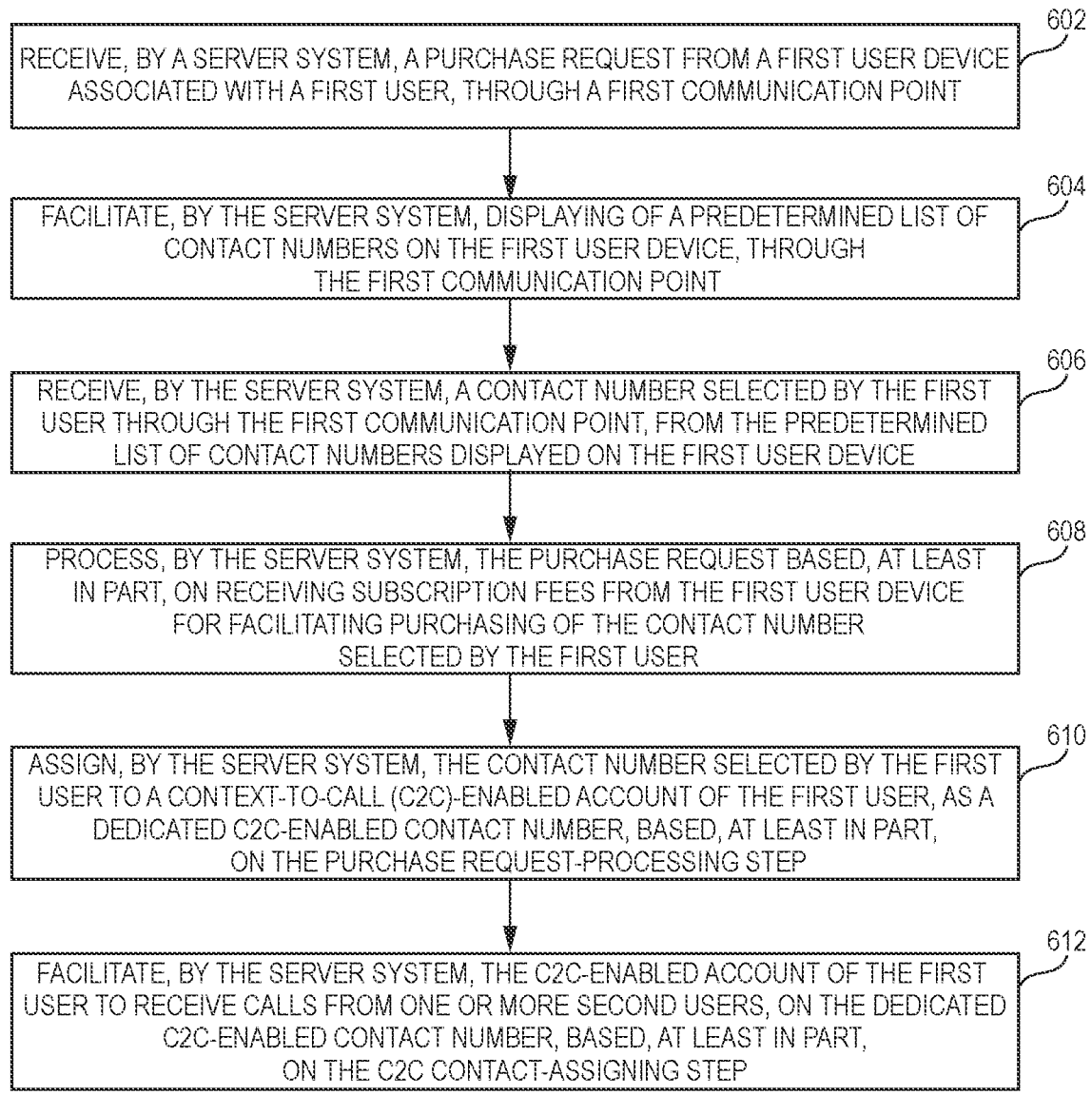
FIG. 6 is a flowchart illustrating a method for facilitating communication between different communication points via a dedicated C2C-enabled contact number, in accordance with an embodiment of the present disclosure.

FIG. 6 is a flow diagram of a method 600 for facilitating communication sessions between a first communication point and a second communication point via a dedicated C2C-enabled contact number. The method 600 depicted in the flow diagram may be executed by, for example, the at least one server system such as the server system 210. Operations of the flow diagram of the method 600, and combinations of operation in the flow diagram of the method 600, may be implemented by, for example, hardware, firmware, a processor, circuitry, and/or a different device associated with the execution of software that includes one or more computer program instructions. The method 600 starts at operation 602.

At 602, the method 600 includes receiving, by the server system 210, a purchase request from a first user device 110 associated with a first user 102, through the first communication point 124. The first communication point 124 may be enabled with a context-to-call (C2C) feature.

At 604, the method 600 includes facilitating, by the server system 210, displaying a predetermined list of contact numbers on the first user device 110, through the first communication point 124.

At 606, the method 600 includes receiving, by the server system 210, a contact number selected by the first user through the first communication point 124, from the predetermined list of contact numbers displayed on the first user device.

At 608, the method 600 includes, processing, by the server system 210, the communication request based, the purchase request based, at least in part, on receiving subscription fee from the first user device for facilitating a purchasing the contact number selected by the first user.

At 610, the method 600 includes assigning, by the server system 210, the contact number selected by the first user to a context-to-call (C2C)-enabled account of the first user, as a dedicated C2C-enabled contact number, based, at least in part, on the purchase request-processing step. The second user device 114 and the second communication point 128 may be enabled with the context-to-call (C2C) feature.

At 612, the method 600 includes facilitating, by the server system 210, the C2C-enabled account of the first user to receive calls from one or more second users, on the dedicated C2C-enabled contact number, based, at least in part, on the C2C contact-assigning step.

Figure 7:
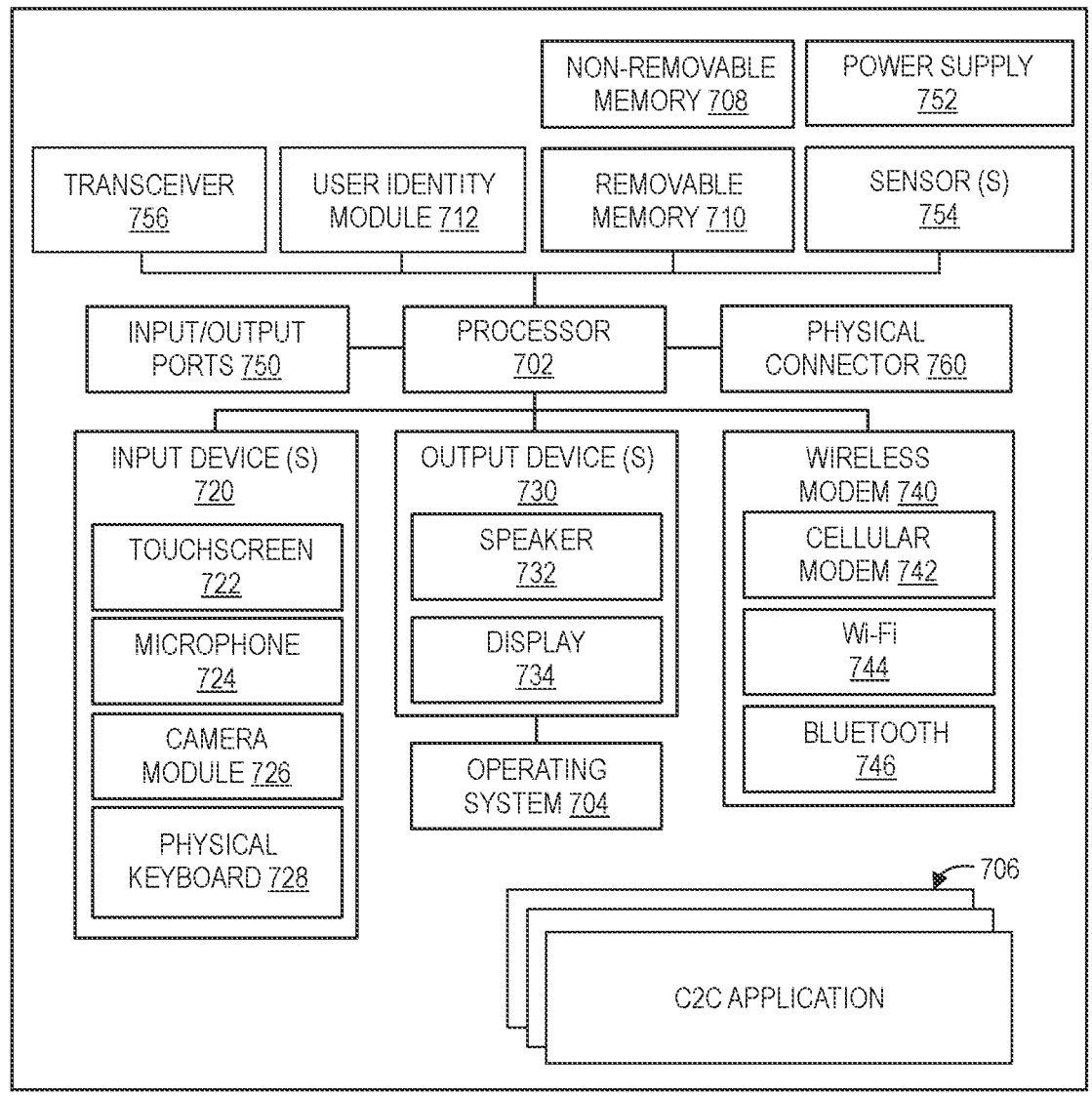
FIG. 7 is a simplified block diagram of an electronic device, in accordance with an embodiment of the present disclosure.

FIG. 7 shows simplified block diagram of a user device 700 for example a mobile phone or a desktop computer capable of implementing the various embodiments of the present disclosure. For example, the user device 700 may correspond to the user devices 110-116 of FIG. 1. The user device 700 is depicted to include one or more applications such as a C2C application 706 facilitated by the server system 210. The C2C application 706 can be an instance of an application downloaded from the server system 210 or a third-party server. The C2C application 706 is capable of communicating with the server system 210 for facilitating communication sessions between the user device 700 and the second user device 114 via a dedicated C2C-enabled contact number shown in FIG. 1.

It should be understood that the user device 700 as illustrated and hereinafter described is merely illustrative of one type of device and should not be taken to limit the scope of the embodiments. As such, it should be appreciated that at least some of the components described below in connection with the user device 700 may be optional and thus in an example embodiment may include more, less, or different components than those described in connection with the example embodiment of the FIG. 7. As such, among other examples, the user device 700 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the user device 700 and supports one or more applications programs such as the C2C application 706, that implements one or more of the innovative features described herein. In addition to the C2C application 706, the applications may include common mobile computing applications (e.g., telephony applications, email applications, calendars, contact managers, web browsers, messaging applications) or any other computing application.

The illustrated user device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the C2C application 706. The user device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the user device 700 and a public switched telephone network (PSTN).

The user device 700 can further include one or more input/output ports 750, a power supply 752, one or more sensors 754 for example, an accelerometer, a gyroscope, a compass, or an infrared proximity sensor for detecting the orientation or motion of the user device 700 and biometric sensors for scanning biometric identity of an authorized user, a transceiver 756 (for wirelessly transmitting analog or digital signals) and/or a physical connector 760, which can be a USB port, IEEE 794 (FireWire) port, and/or RS-232 port. The illustrated components are not required or all-inclusive, as any of the components shown can be deleted and other components can be added.

The disclosed method with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 210 and its various components such as the computer system 212 and the database 214 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method comprising:
   receiving, by a server system, a purchase request from a first user device associated with a first user, through a first communication point;
   facilitating, by the server system, displaying of a predetermined list of contact numbers on the first user device, through the first communication point;
   receiving, by the server system, a contact number selected by the first user through the first communication point, from the predetermined list of contact numbers displayed on the first user device;
   processing, by the server system, the purchase request based, at least in part, on receiving subscription fees from the first user device for facilitating purchasing of the contact number selected by the first user;
   assigning, by the server system, the contact number selected by the first user to a context-to-call (C2C)-enabled account of the first user, as a dedicated C2C-enabled contact number, based, at least in part, on the purchase request-processing step; and
   facilitating, by the server system, the C2C-enabled account of the first user to receive calls from one or more second users, on the dedicated C2C-enabled contact number, based, at least in part, on the C2C contact-assigning step.

2. The computer-implemented method as claimed in claim 1, further comprising:
   receiving, by the server system, a communication request from a second user device associated with a second user, through a second communication point, for initiating a communication session with the first user;
   determining, by the server system, a second user-communication mode selected on the second user device through the second communication point;
   identifying, by the server system, a first user-communication mode selected on the first user device;
   processing, by the server system, the communication request based, at least in part, on a matching between the first user-communication mode and the second user-communication mode; and
   initiating, by the server system, the communication session between the first user and the second user based, at least in part, on the communication request-processing step and the context-to-call (C2C) contact-processing step.

3. The computer-implemented method as claimed in claim 2, wherein receiving the communication request comprises receiving the communication request, based, at least in part, on one of dialling the dedicated C2C-enabled contact number through a dialling pad on the second communication point and selecting the dedicated C2C-enabled contact number from a contact list personalized to the second user through the second communication point.

4. The computer-implemented method as claimed in claim 2, further comprising converting, by the server system, a format of messages conveyed between the first user device and the second user device upon determining that the first communication mode and the second communication mode are different.

5. The computer-implemented method as claimed in claim 2, further comprising applying, by the server system, one or more business rules over the communication request to determine whether to initiate the communication session or not.

6. The computer-implemented method as claimed in claim 2, further comprising transmitting, by the server system, the communication request from the second user device through the second communication point to the first user device through the first communication point, wherein at least one of the first communication point and the second communication point is enabled with a C2C feature.

7. The computer-implemented method as claimed in claim 6, further comprising creating, by the server system, a conference call by enabling addition of one or more user devices to the communication session via at least one of the first communication point and the second communication point.

8. The computer-implemented method as claimed in claim 1, further comprising:
   receiving, by the server system, a non-C2C contact-based communication request from the first user device, through the first communication point;
   processing, by the server system, the non-C2C contact-based communication request, based, at least in part, on examination of a non-C2C contact number being associated with the first user device and the first user being logged-in to the C2C-enabled account;
   facilitating, by the server system, the C2C-enabled account of the first user to receive calls from the one or more second users, on the non-C2C contact number, based, at least in part, on the non-C2C contact-processing step.

9. The computer-implemented method as claimed in claim 1, further comprising facilitating, by the server system, the C2C-enabled account of the first user and a C2C-enabled account of a second user to implement one or more operations, wherein the one or more operations comprises one of: call forwarding, call recording, reviewing call history and logs, adding/editing/deleting a contact number from a contact list.

10. The computer-implemented method as claimed in claim 1, wherein the first communication point and a second communication point comprise one of: a C2C chatbot plug-in, a C2C mobile application, a C2C smart TV application, a C2C browser plug-in, a C2C business mobile application plugin, and a C2C desktop application.

11. The computer-implemented method as claimed in claim 1, further comprising generating, by the server system, the predetermined list of contact numbers, through a third-party communication facilitating platform.

12. A server system, comprising:
   a memory configured to store instructions;
   a communication interface; and
   a processor in communication with the memory and the communication interface, the processor configured to execute the instructions stored in the memory and thereby cause the server system to perform at least in part to:

receive a purchase request from a first user device associated with a first user, through a first communication point;

facilitate displaying of a predetermined list of contact numbers on the first user device, through the first communication point;

receive a contact number selected by the first user through the first communication point, from the predetermined list of contact numbers displayed on the first user device;

process the purchase request based, at least in part, on receiving subscription fees from the first user device for facilitating a purchasing of the contact number selected by the first user; and assign the contact number selected by the first user to a context-to-call (C2C)-enabled account of the first user, as a dedicated C2C-enabled contact number, based, at least in part, on the purchase request-processing step; and facilitate the C2C-enabled account of the first user to receive calls from one or more second users, on the dedicated C2C-enabled contact number, based, at least in part, on the C2C contact-assigning step.

13. The server system as claimed in claim 12, is further caused, at least in part, to:

receive a communication request from a second user device associated with a second user, through a second communication point, for initiating a communication session with the first user;

determine a second user-communication mode selected on the second user device through the second communication point;

identify a first user-communication mode selected on the first user device;

process the communication request based, at least in part, on a matching between the first user-communication mode and the second user-communication mode; and initiate the communication session between the first user and the second user based, at least in part, on the communication request-processing step and the context-to-call (C2C) contact-processing step.

14. The server system as claimed in claim 13, wherein the communication request is received, based, at least in part, on dialling the dedicated C2C-enabled contact number through a dialling pad on the second communication point and selecting the dedicated C2C-enabled contact number from a contact list personalized to the second user through the second communication point.

15. The server system as claimed in claim 13, further caused, at least in part, to convert a format of messages conveyed between the first user device and the second user device upon determining that the first communication mode and the second communication mode are different.

16. The server system as claimed in claim 13, further caused, at least in part, to apply one or more business rules over the communication request to determine whether to initiate the communication session or not.

17. The server system as claimed in claim 13, further caused, at least in part, to transmit the communication request from the second user device through the second communication point to the first user device through the first communication point, wherein at least one of the first communication point and the second communication point is enabled with a C2C feature.

18. The server system as claimed in claim 17, further caused, at least in part, to create a conference call by enabling addition of one or more user devices to the communication session via at least one of the first communication point and the second communication point.

19. The server system as claimed in claim 12, further caused, at least in part, to:

receive a non-C2C contact-based communication request from the first user device, through the first communication point;

process the non-C2C contact-based communication request, based, at least in part, on examination of a non-C2C contact number being associated with the first user device and the first user being logged-in to the C2C-enabled account; and facilitate the C2C-enabled account of the first user to receive calls from the one or more second users, on the non-C2C contact number, based, at least in part, on the non-C2C contact-processing step.

20. The server system as claimed in claim 12, wherein the server system is further caused, at least in part, to facilitate the C2C-enabled account of the first user and a C2C-enabled account of a second user to implement one or more operations, wherein the one or more operations comprises one of: call forwarding, call recording, reviewing call history and logs, adding/editing/deleting a contact number from a contact list.

21. The server system as claimed in claim 12, wherein the server system is further caused, at least in part, to generate the predetermined list contact numbers, through a third-party communication facilitating platform.

22. The server system as claimed in claim 12, further comprises an interaction database, wherein the interaction database is configured to store user data and user profile information associated with a plurality of users and business profile information associated with a plurality of business entities.

* * * * *